United States Patent
Tobin et al.

(10) Patent No.: US 11,390,013 B2
(45) Date of Patent: Jul. 19, 2022

(54) VACUUM FORMING MOLD ASSEMBLY AND ASSOCIATED METHODS

(71) Applicant: General Electric Company, Schenectady, NY (US)

(72) Inventors: James Robert Tobin, Simpsonville, SC (US); Boobalan Ayyasamy, Simpsonville, SC (US); Andrew McCalip, Houston, TX (US)

(73) Assignee: General Electric Company, Schenectady, NY (US)

( * ) Notice: Subject to any disclaimer, the term of this patent is extended or adjusted under 35 U.S.C. 154(b) by 785 days.

(21) Appl. No.: 15/818,886

(22) Filed: Nov. 21, 2017

(65) Prior Publication Data

US 2019/0152127 A1 May 23, 2019

(51) Int. Cl.
*B29C 51/36* (2006.01)
*B29C 33/38* (2006.01)
(Continued)

(52) U.S. Cl.
CPC .......... *B29C 51/36* (2013.01); *B29C 33/3842* (2013.01); *B29C 51/10* (2013.01);
(Continued)

(58) Field of Classification Search
CPC ................ B29C 33/3842; B29C 51/10; B29C 2791/006; B29C 51/36; B29L 2031/085
See application file for complete search history.

(56) References Cited

U.S. PATENT DOCUMENTS

| RE19,412 E | 1/1935 | Zaparka |
| 2,450,440 A | 10/1948 | Mills |

(Continued)

FOREIGN PATENT DOCUMENTS

| CN | 1343162 A | 4/2002 |
| CN | 105034410 A | 11/2005 |

(Continued)

OTHER PUBLICATIONS

CGTech VERICUT, Automated Fibre Placement—wind blade: VERICUT Composite CNC simulation, Sep. 16, 2015, YouTube, retrieved from the Internet on Sep. 28, 2019, URL: https://youtu.be/xFNtTE82DiU (Year: 2015).

(Continued)

*Primary Examiner* — Joseph S Del Sole
*Assistant Examiner* — John Robitaille
(74) *Attorney, Agent, or Firm* — Dority & Manning, P.A.

(57) ABSTRACT

The present disclosure is directed to a method for creating a vacuum forming mold assembly. The method includes forming a plurality of support plates. Each support plate includes a surface defining a shape corresponding to a cross-section of at least a portion of the mold cavity. The method also includes removably coupling a mold body to the plurality of support plates to form the mold assembly. The mold body conforms to the shape of the surface of each support plate after being removably coupled to the plurality of support plates such that the mold body defines at least a portion of a mold cavity of the mold assembly. The mold body defines at least one of one or more vacuum manifolds or one or more fluid passages.

20 Claims, 16 Drawing Sheets

(51) Int. Cl.
  *B33Y 80/00* (2015.01)
  *B29C 51/10* (2006.01)
  *B29L 31/08* (2006.01)

(52) U.S. Cl.
  CPC ... *B29C 2791/006* (2013.01); *B29L 2031/085* (2013.01); *B33Y 80/00* (2014.12)

(56) References Cited

U.S. PATENT DOCUMENTS

| | | | |
|---|---|---|---|
| 2,451,131 | A | 10/1948 | Vidal |
| 2,503,450 | A | 4/1950 | Nebesar |
| 3,000,446 | A | 9/1961 | Warnken |
| 3,093,219 | A | 6/1963 | Ramme |
| 3,137,887 | A | 6/1964 | Mannino et al. |
| 3,321,019 | A | 5/1967 | Dmitroff et al. |
| 3,528,753 | A | 9/1970 | Dutton et al. |
| 3,586,460 | A | 6/1971 | Toner |
| 3,956,564 | A | 5/1976 | Hillig |
| 4,319,872 | A | 3/1982 | Lupke |
| 4,329,119 | A | 5/1982 | Baskin |
| 4,474,536 | A | 10/1984 | Gougeon et al. |
| 4,626,172 | A | 12/1986 | Mouille et al. |
| 4,718,844 | A | 1/1988 | Dickhut |
| 5,031,483 | A | 7/1991 | Weaver |
| 5,059,109 | A | 10/1991 | Dickhut |
| 5,088,665 | A | 2/1992 | Vijgen et al. |
| 5,178,885 | A * | 1/1993 | Vallier ............... B29C 33/0038 249/160 |
| 5,346,367 | A | 9/1994 | Doolin et al. |
| 5,793,015 | A | 8/1998 | Walczyk |
| 6,012,883 | A | 1/2000 | Engwall et al. |
| 6,264,877 | B1 | 7/2001 | Pallu De La Barriere |
| 6,298,896 | B1 * | 10/2001 | Sherrill ................ B29C 43/56 156/581 |
| 6,890,152 | B1 | 5/2005 | Thisted |
| 7,059,833 | B2 | 6/2006 | Stiesdal et al. |
| 7,364,407 | B2 | 4/2008 | Grabau |
| 7,458,777 | B2 | 12/2008 | Herr |
| 7,637,721 | B2 | 12/2009 | Driver et al. |
| 7,976,275 | B2 | 7/2011 | Miebach et al. |
| 7,988,421 | B2 | 8/2011 | Bakhuis et al. |
| 8,007,624 | B2 | 8/2011 | Stiesdal |
| 8,062,728 | B2 | 11/2011 | De Baets |
| 8,083,488 | B2 | 12/2011 | Fritz |
| 8,092,187 | B2 | 1/2012 | Bell |
| 8,162,590 | B2 | 4/2012 | Haag |
| 8,273,806 | B2 | 9/2012 | Guadagno et al. |
| 8,317,479 | B2 | 11/2012 | Vronsky et al. |
| 8,376,450 | B1 | 2/2013 | Long et al. |
| 8,540,491 | B2 | 9/2013 | Gruhn |
| 8,602,761 | B2 | 12/2013 | Arrizabalaga |
| 8,657,581 | B2 | 2/2014 | Pilpel et al. |
| 8,673,106 | B1 | 3/2014 | Jolley et al. |
| 8,678,746 | B2 | 3/2014 | Haag |
| 8,708,691 | B2 | 4/2014 | Matsen et al. |
| 8,747,098 | B1 | 6/2014 | Johnson et al. |
| 8,865,798 | B2 | 10/2014 | Merle et al. |
| 8,877,116 | B2 | 11/2014 | Grabau |
| 8,932,024 | B2 | 1/2015 | Hayashi et al. |
| 8,961,142 | B2 | 2/2015 | Wansink |
| 8,992,813 | B2 | 3/2015 | Robbins et al. |
| 9,090,027 | B2 | 7/2015 | Sutton |
| 9,150,721 | B2 | 10/2015 | Bateman et al. |
| 9,377,005 | B2 | 6/2016 | Yarbrough et al. |
| 9,434,142 | B2 | 9/2016 | Levit |
| 9,458,821 | B2 | 10/2016 | Jacobsen et al. |
| 9,512,818 | B2 | 12/2016 | Richtman |
| 9,719,489 | B2 | 8/2017 | Stewart |
| 10,273,935 | B2 | 4/2019 | Albert |
| 2002/0155186 | A1 * | 10/2002 | Walsh ............... B29C 70/443 425/110 |
| 2004/0253114 | A1 | 12/2004 | Gunneskov et al. |
| 2007/0065290 | A1 | 3/2007 | Herr |
| 2007/0077150 | A1 | 4/2007 | Llorente Gonzalez |
| 2007/0107189 | A1 | 5/2007 | Prichard |
| 2009/0068017 | A1 | 3/2009 | Rudling |
| 2009/0074585 | A1 | 3/2009 | Koegler et al. |
| 2009/0140527 | A1 | 6/2009 | Pawar |
| 2009/0148300 | A1 | 6/2009 | Driver et al. |
| 2009/0155084 | A1 | 6/2009 | Livingston et al. |
| 2009/0301648 | A1 | 12/2009 | Hogg |
| 2010/0047070 | A1 | 2/2010 | Slot |
| 2010/0121475 | A1 | 5/2010 | Lyons |
| 2010/0135806 | A1 | 6/2010 | Benito |
| 2010/0135815 | A1 | 6/2010 | Bagepalli |
| 2010/0296940 | A1 | 11/2010 | Zuteck |
| 2010/0296941 | A1 | 11/2010 | Zuteck |
| 2011/0018282 | A1 | 1/2011 | Hayashi et al. |
| 2011/0076149 | A1 | 3/2011 | Santiago et al. |
| 2011/0097211 | A1 | 4/2011 | Rudling |
| 2011/0097326 | A1 | 4/2011 | Luehrsen |
| 2011/0100540 | A1 | 5/2011 | Matthew |
| 2011/0103965 | A1 | 5/2011 | Matthew |
| 2011/0135467 | A1 | 6/2011 | Saddoughi et al. |
| 2011/0142635 | A1 | 6/2011 | Frizt |
| 2011/0142667 | A1 | 6/2011 | Miebach et al. |
| 2011/0142668 | A1 | 6/2011 | Rao |
| 2011/0142670 | A1 | 6/2011 | Pilpel |
| 2011/0176928 | A1 | 7/2011 | Jensen |
| 2011/0200444 | A1 | 8/2011 | Garcia |
| 2011/0223028 | A1 | 9/2011 | Stege et al. |
| 2011/0243736 | A1 | 10/2011 | Bell |
| 2011/0243750 | A1 | 10/2011 | Gruhn |
| 2011/0266721 | A1 | 11/2011 | Song et al. |
| 2011/0268558 | A1 | 11/2011 | Driver |
| 2011/0286853 | A1 | 11/2011 | Kristensen |
| 2012/0009069 | A1 | 1/2012 | Grove-Nielsen |
| 2012/0027590 | A1 | 2/2012 | Bonnet |
| 2012/0027610 | A1 | 2/2012 | Yarbrough |
| 2012/0027612 | A1 | 2/2012 | Yarbrough |
| 2012/0027613 | A1 | 2/2012 | Yarbrough |
| 2012/0121430 | A1 | 5/2012 | Olsen et al. |
| 2012/0128810 | A1 | 5/2012 | Arriola Arrizabalaga et al. |
| 2012/0134848 | A1 | 5/2012 | Ramirez Jimenez et al. |
| 2012/0138218 | A1 | 6/2012 | Dean et al. |
| 2012/0183408 | A1 | 7/2012 | Noerlem |
| 2012/0186730 | A1 | 7/2012 | Shindo |
| 2012/0263913 | A1 | 10/2012 | Karem |
| 2013/0108455 | A1 | 5/2013 | Quiring et al. |
| 2013/0164133 | A1 | 6/2013 | Grove-Nielsen |
| 2013/0186558 | A1 | 7/2013 | Comb |
| 2013/0241117 | A1 | 9/2013 | Lind |
| 2014/0072715 | A1 | 3/2014 | Jones et al. |
| 2014/0178204 | A1 | 6/2014 | Livingston et al. |
| 2014/0186175 | A1 | 7/2014 | Baehmann et al. |
| 2014/0205454 | A1 | 7/2014 | Giovannetti et al. |
| 2014/0295187 | A1 | 10/2014 | Jacobsen |
| 2014/0322023 | A1 | 10/2014 | Tapia |
| 2014/0328692 | A1 | 11/2014 | Riddell et al. |
| 2014/0334930 | A1 | 11/2014 | Rob |
| 2015/0224759 | A1 | 8/2015 | Boon |
| 2015/0247487 | A1 | 9/2015 | Oerlemans et al. |
| 2015/0308404 | A1 | 10/2015 | Dahl |
| 2015/0316028 | A1 | 11/2015 | Breckenfeld |
| 2015/0322920 | A1 | 11/2015 | Jones |
| 2016/0023433 | A1 | 1/2016 | Langone |
| 2016/0052173 | A1 | 2/2016 | Hunter |
| 2016/0107397 | A1 | 4/2016 | Schibsbye |
| 2016/0146019 | A1 | 5/2016 | Pizano et al. |
| 2016/0168997 | A1 | 6/2016 | Garm |
| 2016/0263844 | A1 | 9/2016 | Smith |
| 2016/0297145 | A1 | 10/2016 | Wu |
| 2016/0319801 | A1 | 11/2016 | Smith |
| 2016/0327019 | A1 | 11/2016 | Tobin et al. |
| 2016/0327020 | A1 | 11/2016 | Tobin et al. |
| 2016/0327021 | A1 | 11/2016 | Tobin et al. |
| 2016/0354984 | A1 | 12/2016 | Hedges |
| 2016/0377050 | A1 | 12/2016 | Caruso et al. |
| 2016/0377051 | A1 | 12/2016 | Caruso et al. |
| 2016/0377052 | A1 | 12/2016 | Caruso et al. |
| 2017/0015066 | A1 | 1/2017 | Herrmann |
| 2017/0021575 | A1 | 1/2017 | Hansen et al. |
| 2017/0022821 | A1 | 1/2017 | Ferber |

(56) References Cited

U.S. PATENT DOCUMENTS

| | | |
|---|---|---|
| 2017/0030330 A1 | 2/2017 | Caruso |
| 2017/0050372 A1 | 2/2017 | Nielsen et al. |
| 2017/0051718 A1 | 2/2017 | Klitgaard |
| 2017/0057158 A1 | 3/2017 | Caruso et al. |
| 2017/0058862 A1 | 3/2017 | Caruso et al. |
| 2017/0058865 A1 | 3/2017 | Caruso et al. |
| 2017/0058866 A1 | 3/2017 | Caruso |
| 2017/0074236 A1 | 3/2017 | Hynum et al. |
| 2017/0074237 A1 | 3/2017 | Caruso et al. |
| 2017/0074238 A1 | 3/2017 | Tobin et al. |
| 2017/0074240 A1 | 3/2017 | Caruso et al. |
| 2017/0082087 A1 | 3/2017 | Yarbrough |
| 2017/0082088 A1 | 3/2017 | Yarbrough et al. |
| 2017/0100902 A1 | 4/2017 | Asmatulu et al. |
| 2017/0113265 A1 | 4/2017 | Slavens et al. |
| 2017/0122287 A1 | 5/2017 | Dobbe et al. |
| 2017/0145990 A1 | 5/2017 | Drack et al. |
| 2017/0175534 A1 | 6/2017 | Ferber |
| 2017/0204833 A1 | 7/2017 | Albert et al. |
| 2017/0225362 A1* | 8/2017 | Anthony ............. B29C 33/3842 |
| 2017/0252966 A1 | 9/2017 | Susnjara |
| 2017/0306766 A1 | 10/2017 | Munzer |
| 2018/0135602 A1 | 5/2018 | Tobin et al. |
| 2018/0156190 A1 | 6/2018 | Johnson |
| 2018/0216601 A1 | 8/2018 | Yarbrough |
| 2018/0223794 A1 | 8/2018 | Tobin et al. |
| 2018/0229452 A1 | 8/2018 | Ogale |
| 2018/0264749 A1 | 9/2018 | Albert |
| 2018/0283349 A1 | 10/2018 | Wardropper |
| 2018/0311927 A1 | 11/2018 | Tyan |
| 2019/0001589 A1 | 1/2019 | Salimi |
| 2019/0032491 A1 | 1/2019 | Nissen et al. |
| 2019/0153994 A1 | 5/2019 | Tobin |
| 2019/0178227 A1 | 6/2019 | Hawkins |
| 2019/0195191 A1 | 6/2019 | Girolamo |
| 2019/0291861 A1 | 9/2019 | McIntyre et al. |
| 2019/0293049 A1 | 9/2019 | Roberts |

FOREIGN PATENT DOCUMENTS

| | | |
|---|---|---|
| CN | 1938148 A | 3/2007 |
| CN | 101511568 A | 8/2009 |
| CN | 101906251 A | 12/2010 |
| CN | 102017790 A | 4/2011 |
| CN | 103358564 A | 10/2013 |
| CN | 204488065 U | 7/2015 |
| CN | 104955278 A | 9/2015 |
| CN | 107187020 A | 9/2018 |
| EP | 0319449 A2 | 6/1989 |
| EP | 0435446 A1 | 7/1991 |
| EP | 0435466 A2 | 7/1991 |
| EP | 1813404 A2 | 8/2007 |
| EP | 2204577 A2 | 7/2010 |
| EP | 2653717 A1 | 10/2013 |
| EP | 3037655 A1 | 6/2016 |
| EP | 3138697 A1 | 8/2017 |
| ES | 2371893 | 11/2012 |
| IT | UD20010007 A1 | 7/2002 |
| JP | H07102609 B2 | 11/1995 |
| JP | 2000 317972 A | 11/2000 |
| JP | 2007/009926 A | 1/2007 |
| JP | 2007/092716 A | 4/2007 |
| JP | 2012 158151 A | 8/2012 |
| JP | 2016 032929 A | 3/2016 |
| KR | 101 520 898 B1 | 5/2015 |
| WO | WO2006/039953 | 4/2006 |
| WO | WO2010/025830 A2 | 3/2010 |
| WO | WO2011/088835 A2 | 7/2011 |
| WO | WO2011/098785 A2 | 8/2011 |
| WO | WO2012/076168 A2 | 6/2012 |
| WO | WO2013/023745 A1 | 2/2013 |
| WO | WO2013/178624 A2 | 12/2013 |
| WO | WO2015/015202 A1 | 2/2015 |
| WO | WO2017/092766 A1 | 6/2017 |
| WO | WO2018/015250 A1 | 1/2018 |

OTHER PUBLICATIONS

Thamizhisai Periyaswamy, Karthikeyan Balasubramanian, Christopher Pastore, "Novel characterization method for fibrous materials using non-contact acoustics: Material properties revealed by ultrasonic perturbations", Sep. 16, 2014, Elsevier, Ultrasonics 56, 261-369 (Year: 2014).

Zhai, Yuwei et. al., Additive Manufactacturing: Making Imagination the Major Limitation, Journal of Metals, vol. 66, No. 5, Springer, NY, Mar. 11, 2014. pp. 808-816.

Patlolla, New progress in self-healing technology of composite wind turbine blades, Department of Mechanical Engineering, Wichita State Univeristy, https://soar.wichita.edu/handle/10057/5493, Feb. 16, 2012, (Abstract Only).

Matt, Development of Novel Self-Healing Polymer Composites for Use in Wind Turbine Blades http://energyresources.asmedigitalcollection.asme.org/article.aspx?articleid=2174064, The American Society of Mechanical Engineers, Journal of Energy Resources Technology, vol. 137, Issue 5, Sep. 1, 2015 (Abstract Only).

Teuwen et al., Vacuum Infused Thermoplastic Composites for Wind Turbine Blades, 2008 Wind Turbine Blade Workshop—Sandia National Laboratories, Jun. 3, 2008, 22 pages.

U.S. Appl. No. 15/424,055, filed Feb. 3, 2017.

U.S. Appl. No. 15/424,084, filed Feb. 3, 2017.

European Search Report for EP Application No. 18880995.8, dated Jul. 7, 2021.

European Search Report for EP Application No. 18880855.4, dated Jul. 7, 2021.

Foreign Office Action for application CN201880087172.3, dated Dec. 22, 2021.

English translation of Foreign Office Action for CN201880087172.3, dated Dec. 22, 2021.

* cited by examiner

VACUUM FORMING MOLD ASSEMBLY AND ASSOCIATED METHODS

FIELD

The present disclosure generally relates to vacuum forming molds. More particularly, the present disclosure relates vacuum forming mold assemblies and associated methods for creating vacuum forming mold assemblies, such as for use in forming wind turbine components.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

Each rotor blade generally includes various shell portions, such as a pressure side shell and a suction side shell bonded together along leading and trailing edges of the rotor blade. The shells are formed using a suitable mold. For example, in certain instances, the mold may be formed via sand casting. After casting, the mold may be finish machined to improve its dimensional accuracy and/or surface finish. However, given the large size of many wind turbine rotor blades, such finish machining operations are time-consuming and expensive, thereby increasing the overall cost of the wind turbine. Furthermore, such molds are difficult to modify when the design of the rotor blades changes. As such, new molds are required when modifications to the rotor blade design are made.

Accordingly, an improved vacuum forming mold assembly and a method for creating a vacuum forming mold assembly would be welcomed in the art.

BRIEF DESCRIPTION

Aspects and advantages of the technology will be set forth in part in the following description, or may be obvious from the description, or may be learned through practice of the technology.

In one aspect, the present disclosure is directed to a method for creating a vacuum forming mold assembly. The method includes forming a plurality of support plates. Each support plate includes a surface defining a shape corresponding to a cross-section of at least a portion of the mold cavity. The method also includes removably coupling a mold body to the plurality of support plates to form the mold assembly. The mold body conforms to the shape of the surface of each support plate after being removably coupled to the plurality of support plates such that the mold body defines at least a portion of a mold cavity of the mold assembly. The mold body defines at least one of one or more vacuum manifolds or one or more fluid passages.

In another aspect, the present disclosure is directed to a vacuum forming mold assembly. The vacuum forming mold assembly includes a plurality of support plates. Each support plate includes a surface defining a shape corresponding to a cross-section of at least a portion of the mold cavity. The vacuum forming mold assembly also includes a mold body removably coupled to the plurality of support plates. The mold body conforms to the shape of the surface of each support plate after being removably coupled to the plurality of support plates such that the mold body defines at least a portion of a mold cavity of the mold assembly. The mold body defines at least one of one or more vacuum manifolds or one or more fluid passages.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
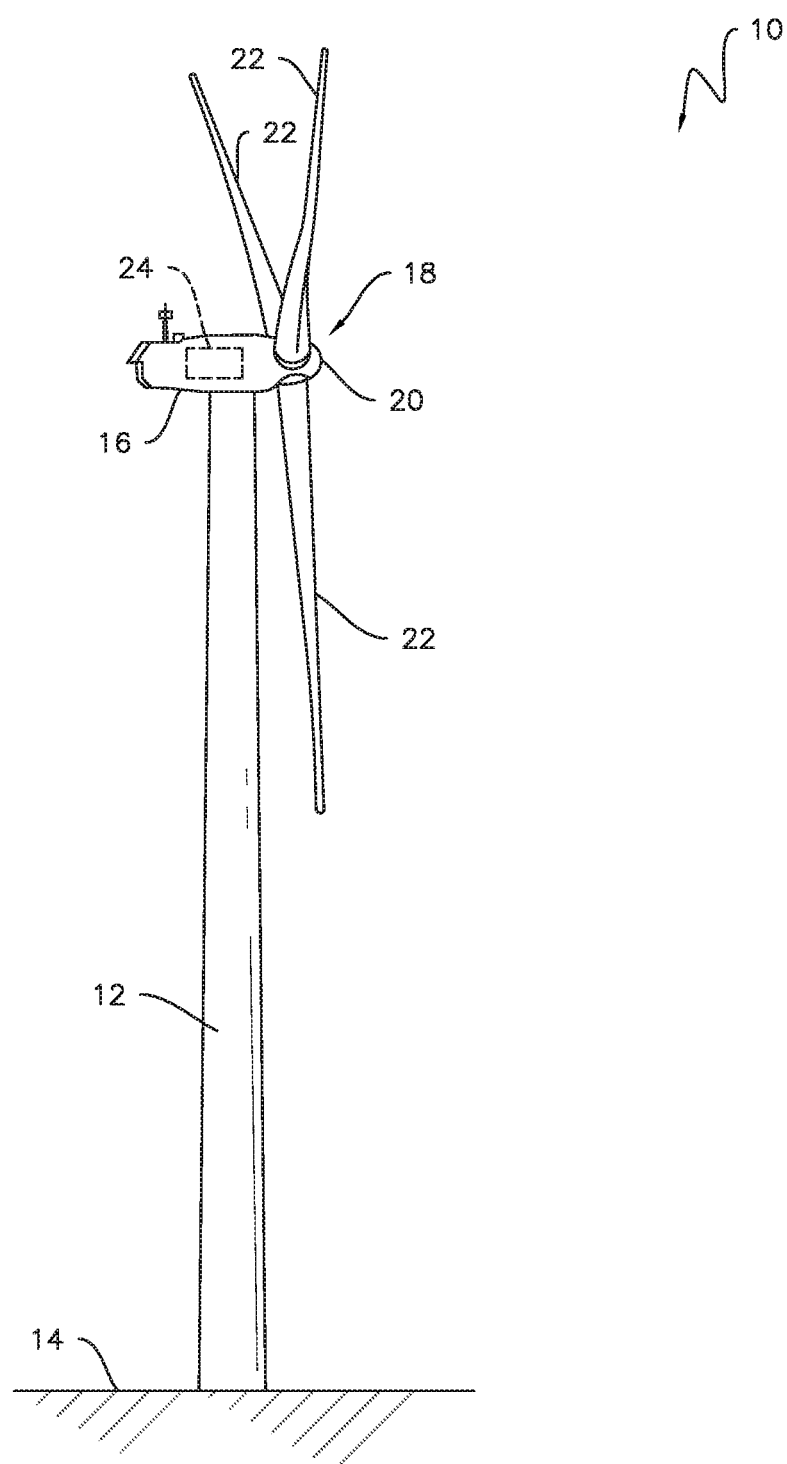
FIG. 1 is a perspective view of one embodiment of a wind turbine in accordance with aspects of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotating the rotor 18 to convert kinetic energy from the wind into usable mechanical energy, and subsequently, electrical energy. For instance, the hub 20 may be rotatably coupled to an electric generator 24 positioned within the nacelle 16.

Figure 2:
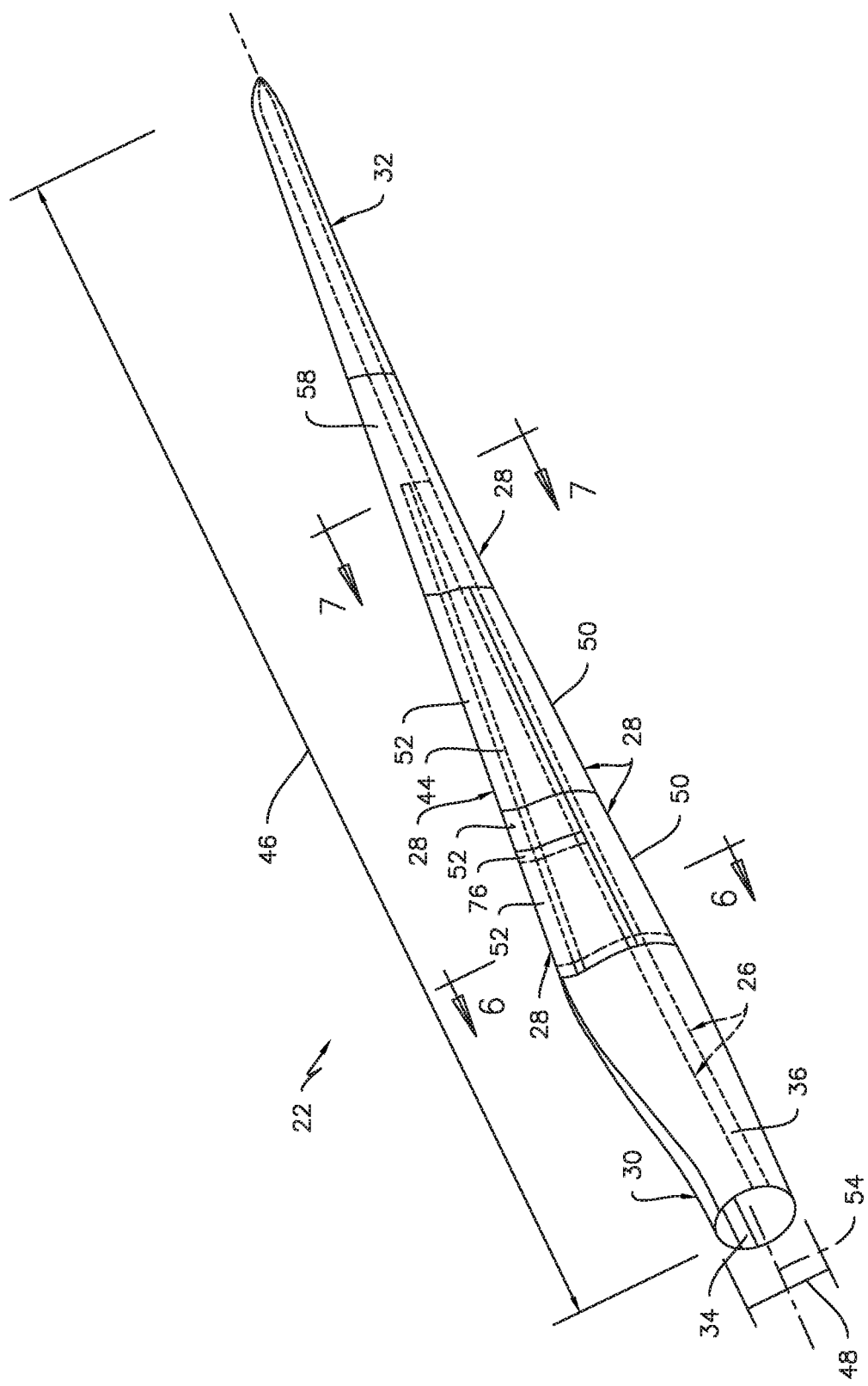
FIG. 2 is a perspective view of one embodiment of a modular rotor blade of a wind turbine in accordance with aspects of the present disclosure.
Figure 3:
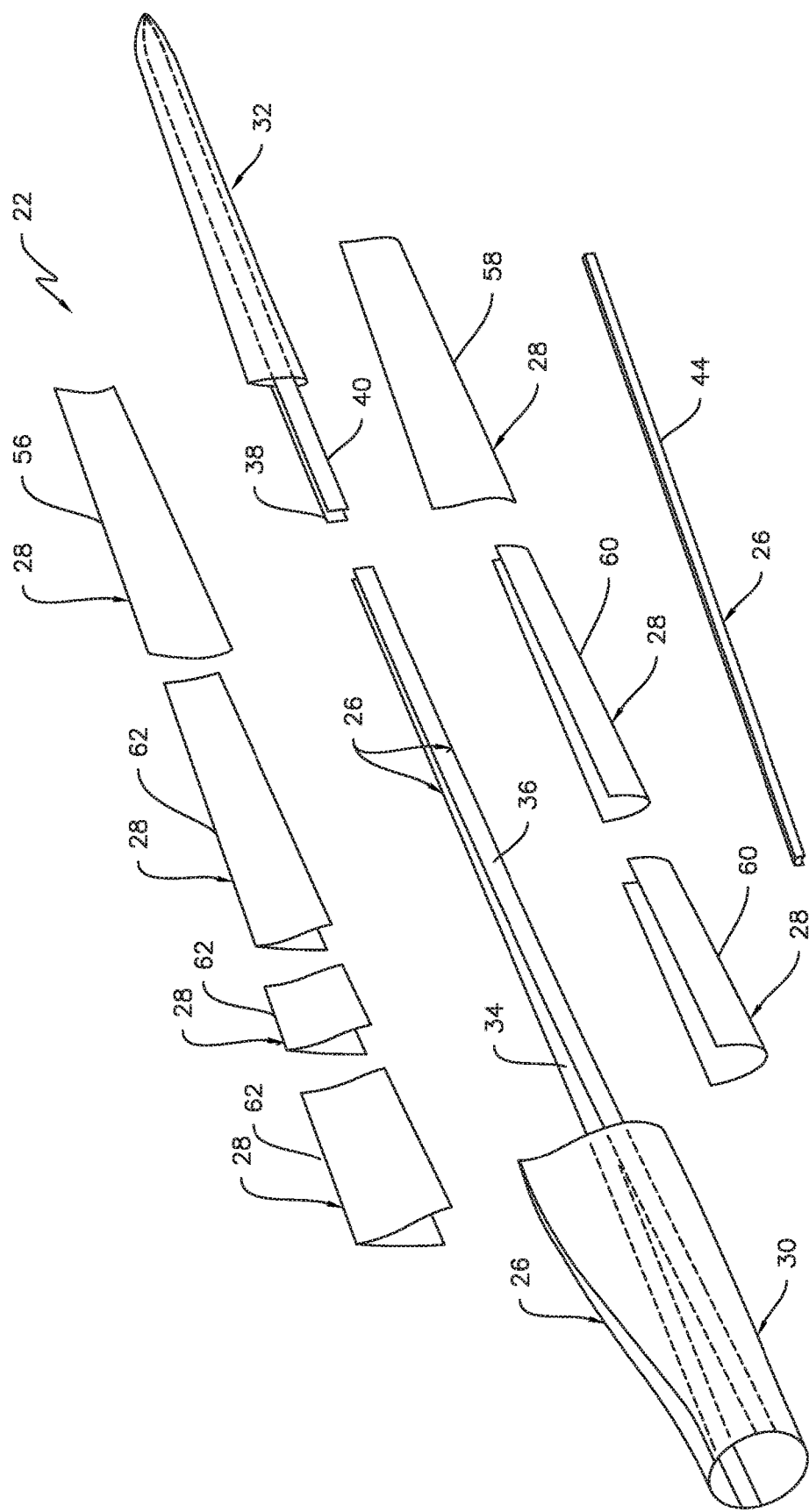
FIG. 3 is an exploded view of the modular rotor blade shown in FIG. 2 in accordance with aspects of the present disclosure.

Referring now to FIGS. 2 and 3, various views of a rotor blade 16 according to the present disclosure are illustrated. As shown, the illustrated rotor blade 22 has a segmented or modular configuration. It should also be understood that the rotor blade 22 may include any other suitable configuration now known or later developed in the art. As shown, the modular rotor blade 22 includes a main blade structure 26 constructed, at least in part, from a thermoset and/or a thermoplastic material and at least one blade segment 28 configured with the main blade structure 26. More specifically, as shown, the rotor blade 22 includes a plurality of blade segments 28. The blade segment(s) 28 may also be constructed, at least in part, from a thermoset and/or a thermoplastic material.

The thermoplastic rotor blade components and/or materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material as described herein may optionally be reinforced with a fiber material, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the stiffness required in the corresponding blade component, the region or location of the blade component in the rotor blade 22, and/or the desired weldability of the component.

Figure 6:
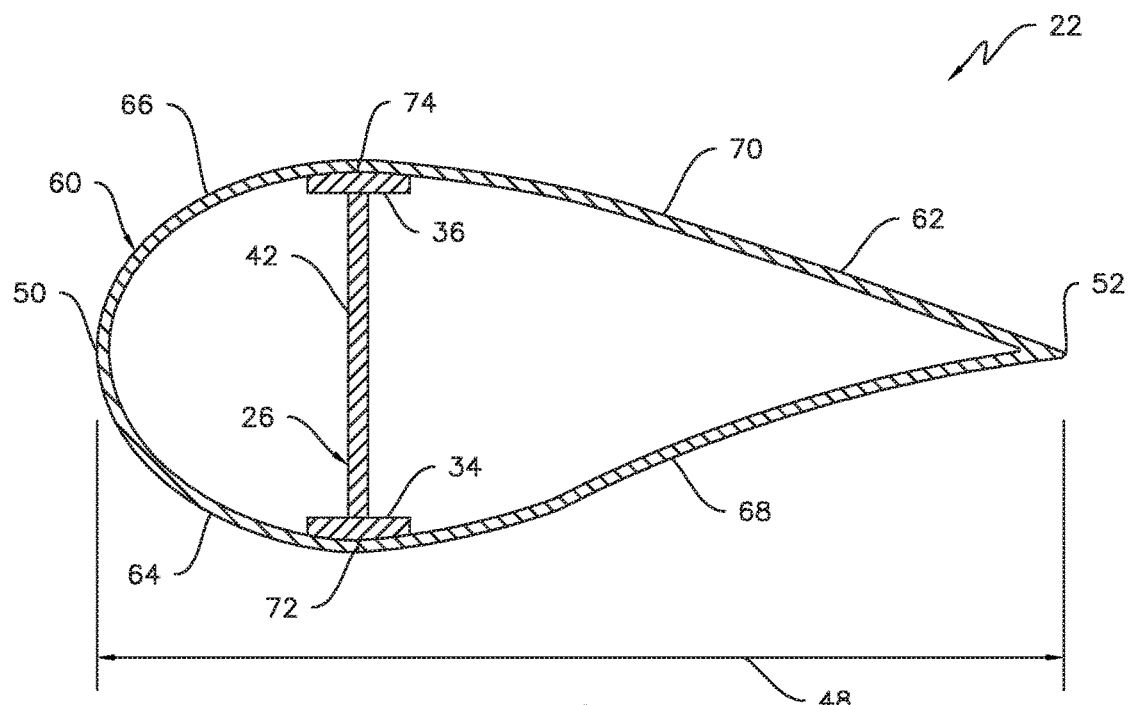
FIG. 6 is a cross-sectional view of the modular rotor blade of FIG. 2 in accordance with aspects of the present disclosure.

More specifically, as shown, the main blade structure 26 may include any one of or a combination of the following: a pre-formed blade root section 30, a pre-formed blade tip section 32, one or more one or more continuous spar caps 34, 36, 38, 40, one or more shear webs 42 (FIGS. 6-7), an additional structural component 44 secured to the blade root section 30, and/or any other suitable structural component of the rotor blade 22. Further, the blade root section 30 is configured to be mounted or otherwise secured to the hub 20 (FIG. 1). In addition, as shown in FIG. 2, the rotor blade 22 defines a span 46 that is equal to the total length between the blade root section 30 and the blade tip section 32. As shown in FIGS. 2 and 6, the rotor blade 22 also defines a chord 48 that is equal to the total length between a leading edge 50 of the rotor blade 22 and a trailing edge 52 of the rotor blade 22. As is generally understood, the chord 48 may generally vary in length with respect to the span 46 as the rotor blade 22 extends from the blade root section 30 to the blade tip section 32.

Figure 4:
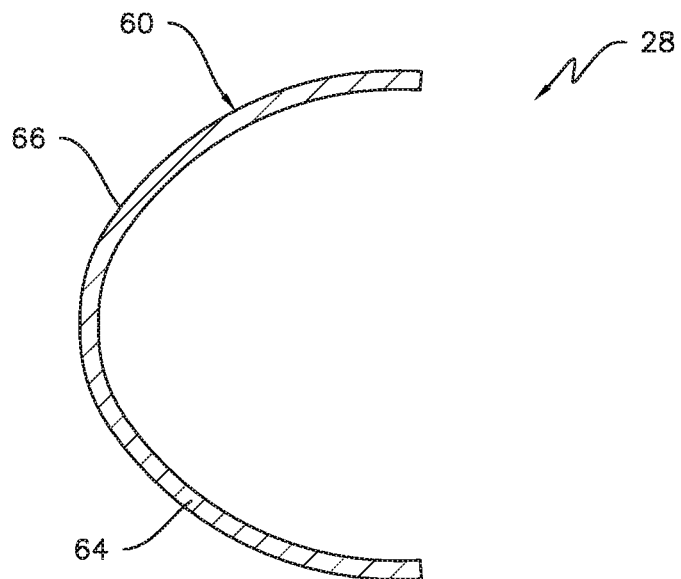
FIG. 4 is a cross-sectional view of one embodiment of a leading edge segment of a modular rotor blade in accordance with aspects of the present disclosure.

Referring particularly to FIGS. 2-4, any number of blade segments 28 or panels having any suitable size and/or shape may be generally arranged between the blade root section 30 and the blade tip section 32 along a longitudinal axis 54 in a generally span-wise direction. Thus, the blade segments 28 generally serve as the outer casing/covering of the rotor blade 22 and may define a substantially aerodynamic profile, such as by defining a symmetrical or cambered airfoil-shaped cross-section. In additional embodiments, it should be understood that the blade segment portion of the blade 22 may include any combination of the segments described herein and are not limited to the embodiment as depicted. In addition, the blade segments 28 may be constructed of any suitable materials, including but not limited to a thermoset material or a thermoplastic material optionally reinforced with one or more fiber materials. More specifically, in certain embodiments, the blade panels 28 may include any one of or combination of the following: pressure and/or suction side segments 56, 58, (FIGS. 2 and 3), leading and/or trailing edge segments 60, 62 (FIGS. 2-6), a non-jointed segment, a single-jointed segment, a multi-jointed blade segment, a J-shaped blade segment, or similar.

Figure 5:
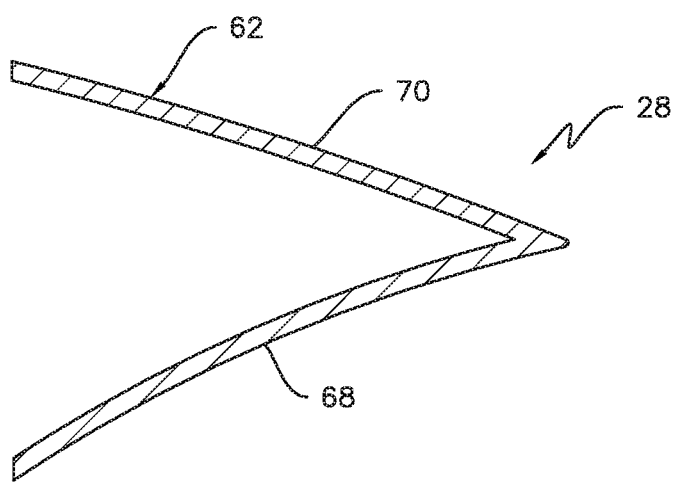
FIG. 5 is a cross-sectional view of one embodiment of a trailing edge segment of a modular rotor blade in accordance with aspects of the present disclosure.

More specifically, as shown in FIG. 4, the leading edge segments 60 may have a forward pressure side surface 64 and a forward suction side surface 66. Similarly, as shown in FIG. 5, each of the trailing edge segments 62 may have an aft pressure side surface 68 and an aft suction side surface 70. Thus, the forward pressure side surface 64 of the leading edge segment 60 and the aft pressure side surface 68 of the trailing edge segment 62 generally define a pressure side surface of the rotor blade 22. Similarly, the forward suction side surface 66 of the leading edge segment 60 and the aft suction side surface 70 of the trailing edge segment 62 generally define a suction side surface of the rotor blade 22. In addition, as particularly shown in FIG. 6, the leading edge segment(s) 60 and the trailing edge segment(s) 62 may be joined at a pressure side seam 72 and a suction side seam 74. For example, the blade segments 60, 62 may be configured to overlap at the pressure side seam 72 and/or the suction side seam 74. Further, as shown in FIG. 2, adjacent blade segments 28 may be configured to overlap at a seam 76. Thus, where the blade segments 28 are constructed at least partially of a thermoplastic material, adjacent blade segments 28 can be welded together along the seams 72, 74, 76, which will be discussed in more detail herein. Alternatively, in certain embodiments, the various segments of the rotor blade 22 may be secured together via an adhesive (or mechanical fasteners) configured between the overlapping leading and trailing edge segments 60, 62 and/or the overlapping adjacent leading or trailing edge segments 60, 62.

In specific embodiments, as shown in FIGS. 2-3 and 6-7, the blade root section 30 may include one or more longitudinally extending spar caps 34, 36 infused therewith. For example, the blade root section 30 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 32 may include one or more longitudinally extending spar caps 38, 40 infused therewith. More specifically, as shown, the spar caps 34, 36, 38, 40 may be configured to be engaged against opposing inner surfaces of the blade segments 28 of the rotor blade 22. Further, the blade root spar caps 34, 36 may be configured to align with the blade tip spar caps 38, 40. Thus, the spar caps 34, 36, 38, 40 may generally be designed to control the bending stresses and/or other loads acting on the rotor blade 22 in a generally span-wise direction (a direction parallel to the span 46 of the rotor blade 22) during operation of a wind turbine 10. In addition, the spar caps 34, 36, 38, 40 may be designed to withstand the span-wise compression occurring during operation of the wind turbine 10. Further, the spar cap(s) 34, 36, 38, 40 may be configured to extend from the blade root section 30 to the blade tip section 32 or a portion thereof. Thus, in certain embodiments, the blade root section 30 and the blade tip section 32 may be joined together via their respective spar caps 34, 36, 38, 40.

In addition, the spar caps 34, 36, 38, 40 may be constructed of any suitable materials, e.g. a thermoplastic or thermoset material or combinations thereof. Further, the spar caps 34, 36, 38, 40 may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 34, 36, 38, 40 may be formed of the same pre-cured composites or different pre-cured composites. In addition, the pultruded components may be produced from rovings, which generally encompass long and narrow bundles of fibers that are not combined until joined by a cured resin.

Figure 7:
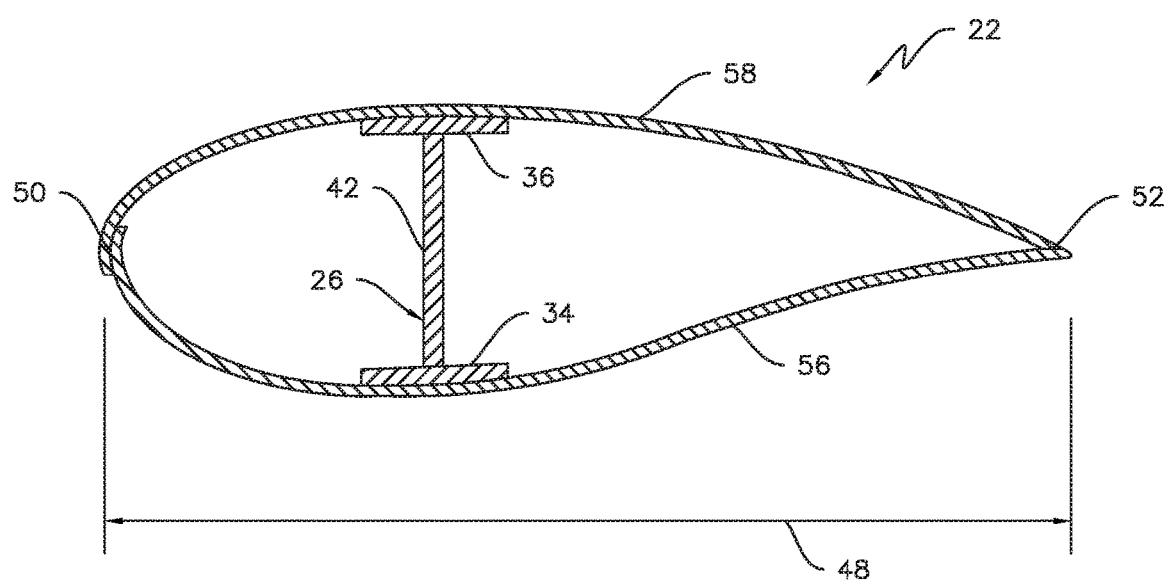
FIG. 7 is a cross-sectional view of the modular rotor blade of FIG. 2 in accordance with aspects of the present disclosure.

Referring to FIGS. 6-7, one or more shear webs 42 may be configured between the one or more spar caps 34, 36, 38, 40. More particularly, the shear web(s) 42 may be configured to increase the rigidity in the blade root section 30 and/or the blade tip section 32. Further, the shear web(s) 42 may be configured to close out the blade root section 30.

In addition, as shown in FIGS. 2 and 3, the additional structural component 44 may be secured to the blade root section 30 and extend in a generally span-wise direction so as to provide further support to the rotor blade 22. For example, the structural component 44 may be configured according to U.S. application Ser. No. 14/753,150 filed Jun. 29, 2015 entitled "Structural Component for a Modular Rotor Blade" which is incorporated herein by reference in its entirety. More specifically, the structural component 44 may extend any suitable distance between the blade root section 30 and the blade tip section 32. Thus, the structural component 44 is configured to provide additional structural support for the rotor blade 22 as well as an optional mounting structure for the various blade segments 28 as described herein. For example, in certain embodiments, the structural component 44 may be secured to the blade root section 30 and may extend a predetermined span-wise distance such that the leading and/or trailing edge segments 60, 62 can be mounted thereto.

FIGS. 8-13 illustrate one embodiment of a mold assembly 100 in accordance with aspects of the present disclosure. In general, the mold assembly 100 is configured for vacuum forming various thermoplastic components. For example, the mold assembly 100 may be configured to form one of the blade segments 28 of the rotor blade 22, such as one of the pressure side segments 56, suction side segments 58, the leading edge segments 60, and/or the trailing edge segments 62. Nevertheless, in alternative embodiments, the mold assembly 100 may be configured to form any other suitable thermoplastic component for use in any other suitable application, including applications outside of wind turbines. Furthermore, in one embodiment, the mold assembly 100 may be configured for placement within a bed of an additive manufacturing device, such as a three-dimensional printer (not shown).

As illustrated in FIGS. 8-13, the mold assembly 100 defines various directions. More specifically, in several embodiments, the directions of the mold assembly 100 may be defined relative to the particular component of which the mold assembly 100 is configured to form (e.g., the blade segment 28). As such, in the illustrated embodiment, the mold assembly 100 defines a span-wise direction (e.g., as indicated by arrow 102 in FIGS. 8-13) extending between a root side 104 of the mold assembly 100 and a tip side 106 of the mold assembly 100. The mold assembly 100 also defines a chord-wise direction (e.g., as indicated by arrow 108 in FIGS. 8-13) extending between a leading edge side 110 of the mold assembly 100 and a trailing edge side 112 of the mold assembly 100. Furthermore, the mold assembly 100 defines a vertical direction (e.g., as indicated by arrow 114 in FIGS. 8-11) extending between a bottom side 116 of the mold assembly 100 and a top side 118 of the mold assembly 100. In alternative embodiments, however, the mold assembly 100 may define other directions in addition to or in lieu of the span-wise, chord-wise, and vertical directions 102, 108, 114 depending on the particular configuration of the thermoplastic component.

Figure 8:
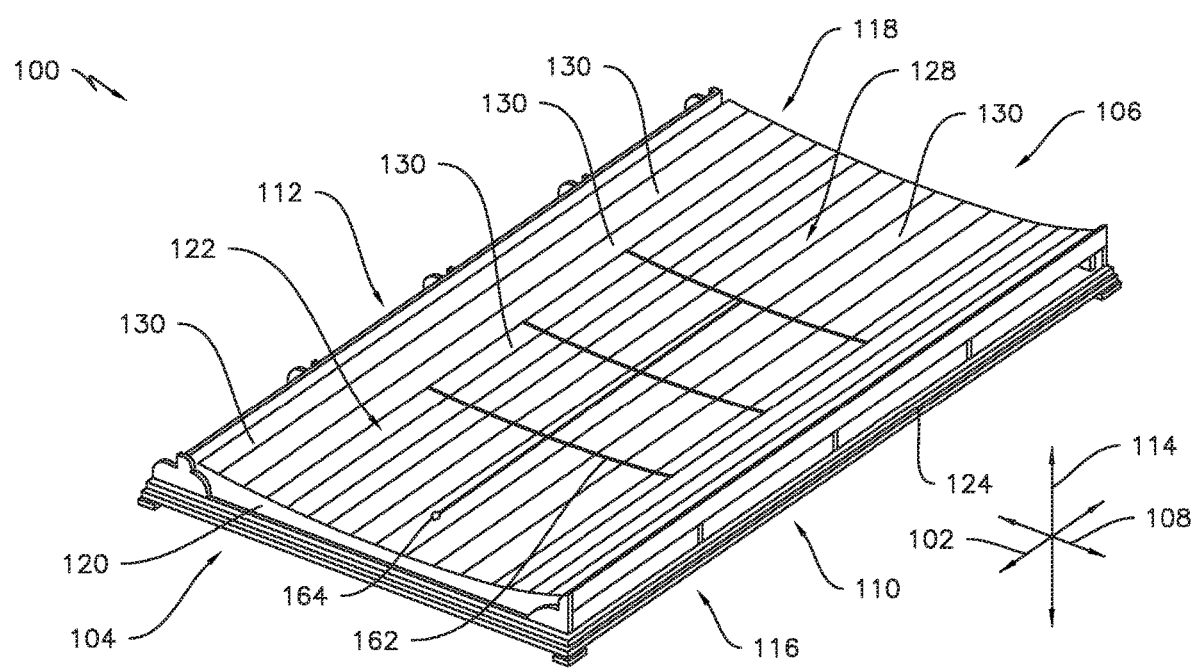
FIG. 8 is a perspective view of one embodiment of a vacuum forming mold assembly in accordance with aspects of the present disclosure.
Figure 9:
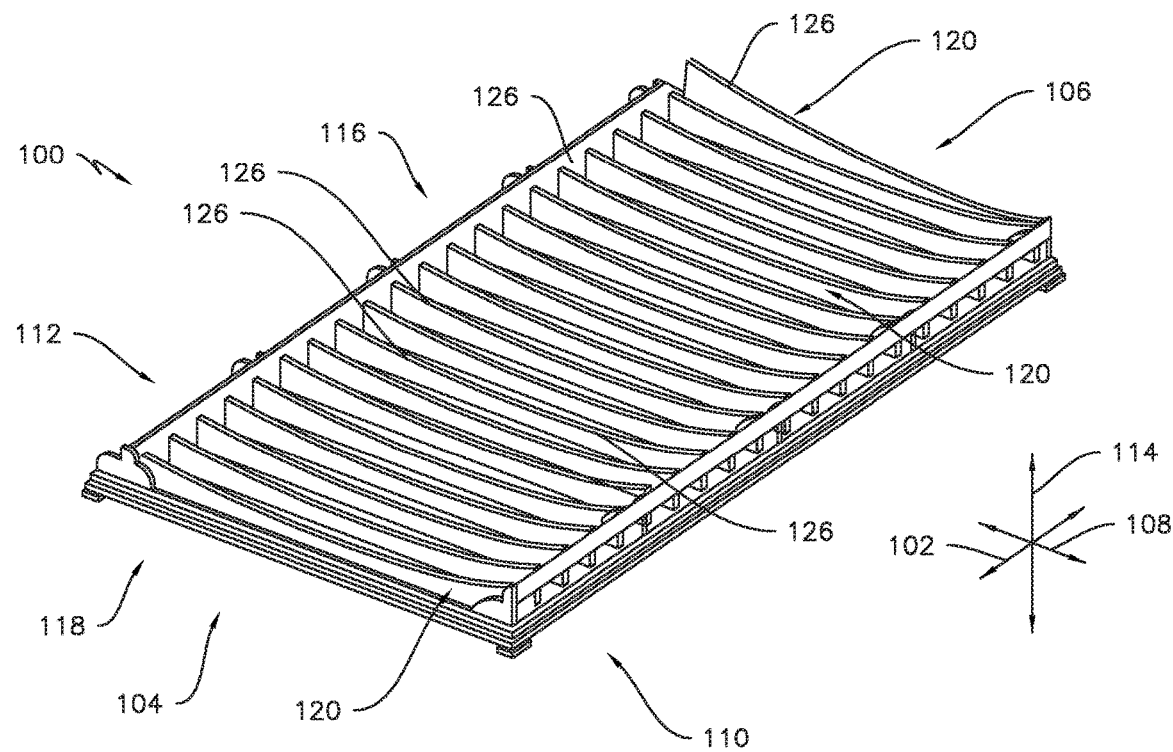
FIG. 9 is a perspective view of one embodiment of a vacuum forming mold assembly in accordance with aspects of the present disclosure, illustrating a plurality of spaced apart support plates of a vacuum forming mold assembly.

As shown in FIGS. 8 and 9, the mold assembly 100 includes a plurality of spaced apart support plates 120. In general, the support plates 120 are configured to support a mold body 122 of the mold assembly 100 relative to a base frame 124 (FIG. 14) of the mold assembly 100. In this respect, the each support plate 120 may have a beam-like configuration. Furthermore, as will be described in greater detail below, each support plate 120 includes a top surface 126 defining a shape corresponding to a cross-section of at least a portion of a mold cavity 128 of the mold assembly 100. Additionally, in the illustrated embodiment, the support plates 120 may be spaced apart along the span-wise direction 102. However, in alternative embodiments, the support plates 120 may be spaced apart along the chord-wise direction 108 or any other suitable direction. Additionally, although the mold assembly 100 is shown as having a particular number of support plates 120, the mold assembly 100 may include any suitable number of support plates 120.

The mold assembly 100 also includes a plurality of mold body segments 130. As will be described in greater detail below, the mold body segments 130 are removably coupled together to form the mold body 122 of the mold assembly 100. In the embodiment illustrated in FIG. 8, the mold assembly 100 includes a particular number of mold body segments 130. Nevertheless, in alternative embodiments, the mold assembly 100 may include any suitable number of mold body segments 130. Furthermore, in several embodiments, the mold body segments 130 may be formed from aluminum and any other suitable material.

Figure 10:
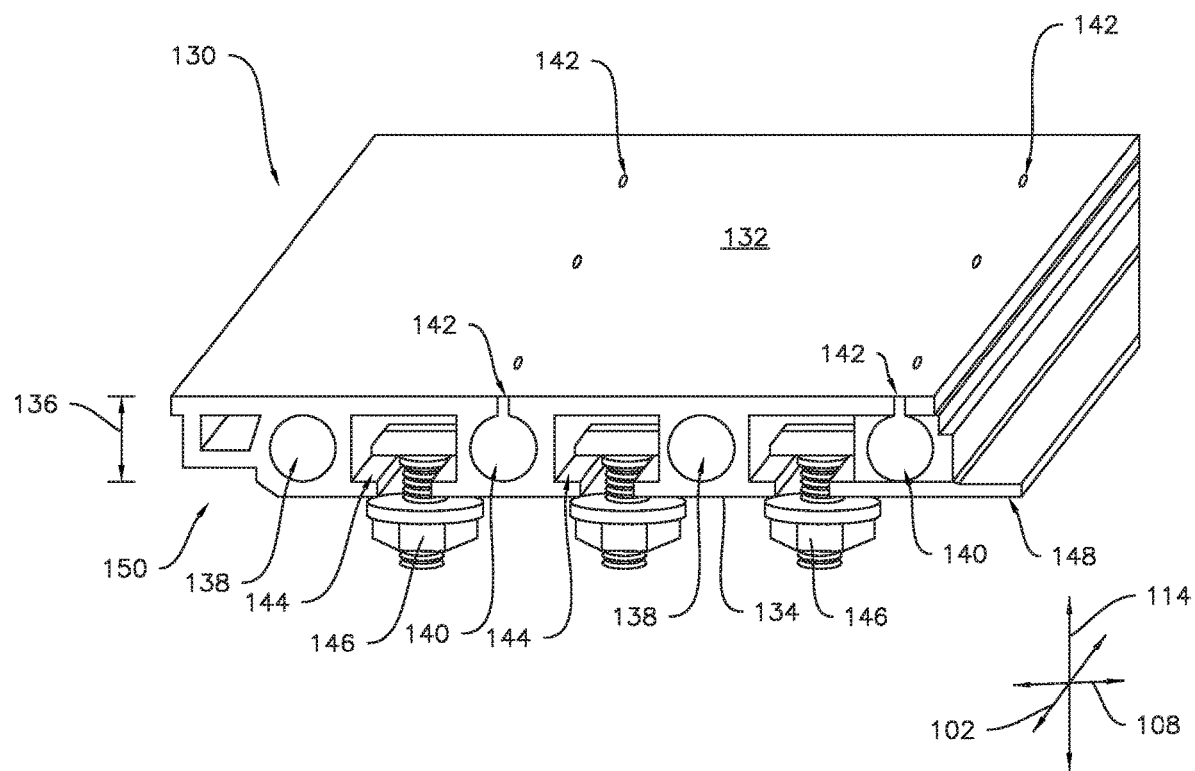
FIG. 10 is a perspective view of one embodiment of a mold body segment of a vacuum forming mold assembly in accordance in accordance with aspects of the present disclosure.

FIG. 10 illustrates one of the mold body segments 130 in greater detail. As shown, each mold body segment 130 includes a top surface 132 at least partially defining the mold cavity 128 and a bottom surface 134 vertically spaced apart from the top surface 132. In this respect, the first surface 132 of the mold body segment 130 may be positioned at or proximate the top side 118 of the mold assembly 100, while the bottom surface 134 of the mold body segment 130 may be positioned at or proximate to the bottom side 114 of the mold assembly 100. As such, the mold body segment 130 defines a thickness (e.g., as indicated by arrow 136 in FIG. 10) extending vertically between the top and bottom surfaces 132, 134. In general, the thickness 136 should be sized such that that the mold body segment 130 is able to bend or otherwise deform (e.g., elastically or plastically) to conform to the top surface 126 of the support plates 120. In one embodiment, each mold body segment 130 may formed via extrusion. Although, each mold body segment 130 may be formed via any other suitable manufacturing process in alternative embodiments.

As shown, one or more of the mold body segments 130 may define a one or more fluid passages 138 extending therethrough. In general, a heating fluid may flow through the fluid passages 138 in the mold body segment 130 to heat the mold body 122 for vacuum forming a thermoplastic sheet. Although, a coolant may flow through the fluid passages 138 to cool the mold body 122 in certain embodiments. In one embodiment, the fluid passages 138 may extend along the span-wise direction 102 through the mold body segment 130. As such, the fluid passages 138 may be spaced apart from each other along the chord-wise direction 108. Nevertheless, in alternative embodiments, the fluid passages 138 may extend through the mold body segment 130 in any suitable manner. Further embodiments of the mold body segment 130 may define more or fewer the fluid passages 138 including no fluid passages 138 at all. In certain embodiments, an external heater (not shown) coupled to the bottom surfaces 134 of one or more of the mold body segments 130. Such heating elements may heat the mold body 122 in addition to or in lieu of the fluid flowing through the fluid passages 138. For example, such heating elements may permit selective heating of particular portions of the mold body 122.

One or more of the mold body segments 130 may also define one or more vacuum manifolds 140 extending therethrough. In one embodiment, the vacuum manifolds 140 may extend along the span-wise direction 102 through the mold body segment 130. As such, the vacuum manifolds 140 may be spaced apart from each other along the chord-wise direction 108. Nevertheless, in alternative embodiments, the vacuum manifolds 140 may extend through the mold body segment 130 in any suitable manner. Furthermore, one or more of the mold body segments 130 define a plurality of vacuum passages 142. As shown, each vacuum passage 142 fluidly couples the mold cavity 128 and a corresponding vacuum manifold 140. In this respect, each vacuum passage 142 extends from the corresponding vacuum manifold 140 to the top surface 132 of the mold body segment 130 in a direction that is normal to the top surface 132. In operation, a vacuum may be applied to each vacuum manifold 140 by a suitable a vacuum pump or another suitable vacuum source (not shown). As such, the vacuum causes the thermoplastic sheet to conform shape of the mold cavity 128 (i.e., conform to the top surfaces 132 of the mold body segments 130).

Furthermore, the mold body segments 130 may also define a plurality of slots 144 extending therethrough. In general, each slot 144 is configured to receive one or more fasteners 146 for coupling the associated mold body segment 130 to the support plates 120. As shown, the slots 144 may extend from the bottom surface 134 of the mold body segment 130 vertically upward toward the top surface 132 of the mold body segment 130. In one embodiment, the slots 144 may extend along the span-wise direction 102 through the mold body segment 130. As such, the slots 144 may be spaced apart from each other along the chord-wise direction 108. Nevertheless, in alternative embodiments, the slots 144 may extend through the mold body segment 130 in any suitable manner. Furthermore, in the illustrated embodiment, the fasteners 146 may correspond to T-bolts and associated nuts. Nevertheless, the fasteners 146 may correspond to any other suitable type of fastener.

Figure 11:
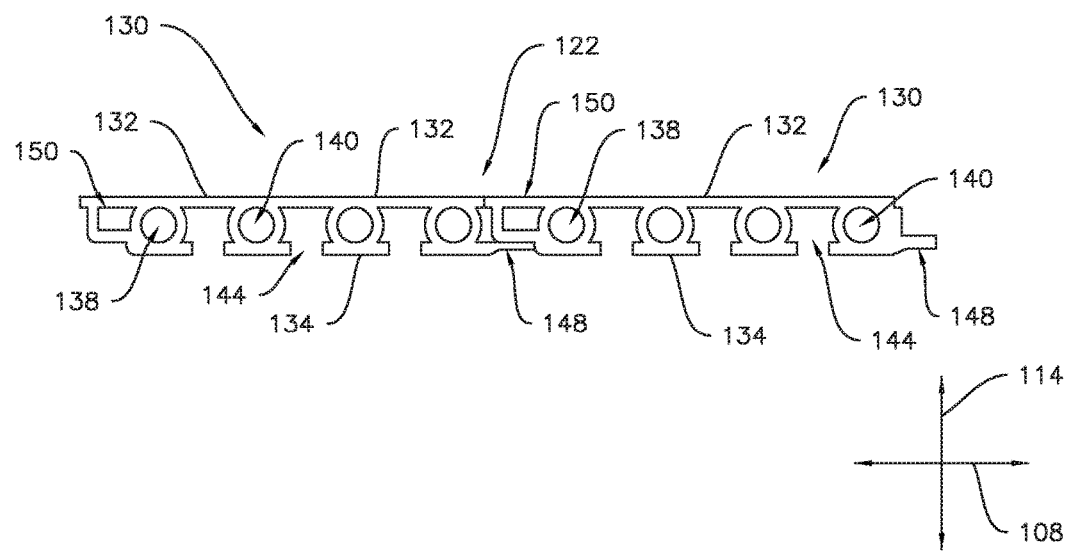
FIG. 11 is a front view of one embodiment of a pair of mold body segments coupled together in accordance with aspects of the present disclosure.

Referring now to FIG. 11, as mentioned above, the mold body segments 130 may be removably coupled together to form the mold body 122. For example, in one embodiment, the mold body segments 130 may be stacked together along the chord-wise direction 108 and removably coupled together. Nevertheless, in alternative embodiments, the mold body segments 130 may also be stacked together along the span-wise direction 102 and removably coupled together. To facilitate removable coupling, each mold body segment 130 may include a first connection feature 148 positioned at one end of the mold body segment 130 and a second connection feature 150 positioned at an opposing end of the mold body segment 130. In general, the first connection feature 148 on one of the mold body segments 130 is configured to mate with or otherwise engage the second connection feature 150 of the adjacent mold body segment 130. In the illustrated embodiment, the first and second connection features 148, 150 are complementary projections. Suitable fasteners 152 (FIG. 12) may couple the mating first and second connection features 148, 150.

Figure 12:
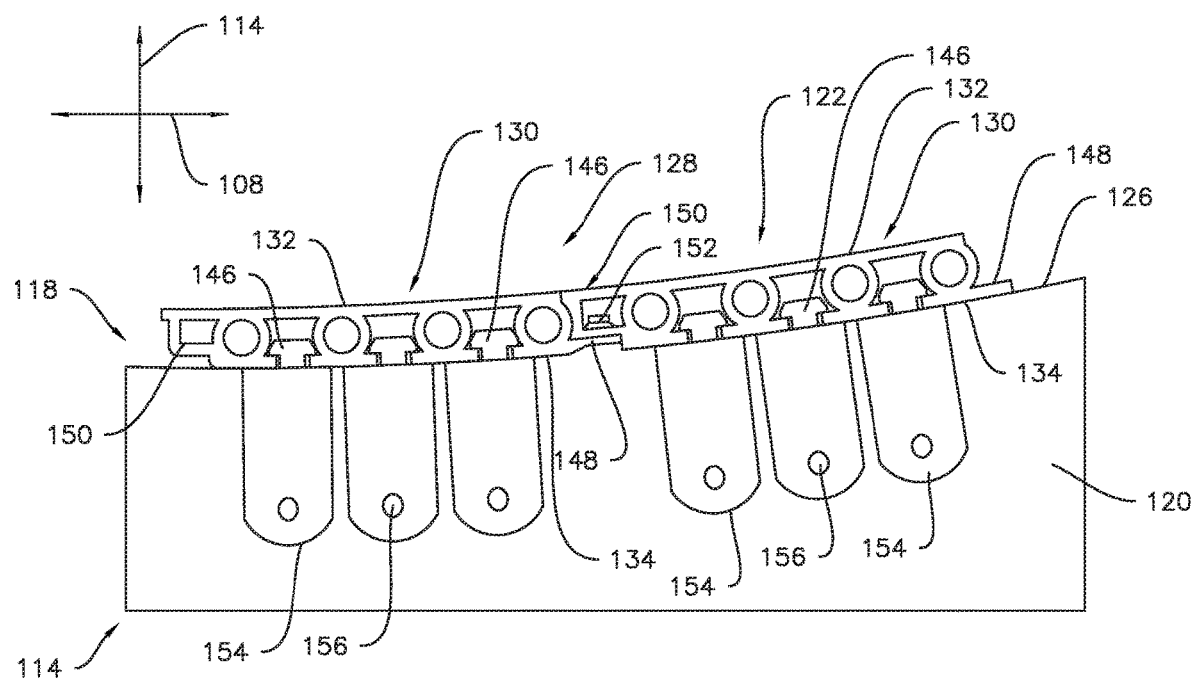
FIG. 12 is a front view of one embodiment of a portion of a vacuum forming mold assembly in accordance with aspects of the present disclosure, illustrating a pair of mold body segments removably coupled to a support plate.
Figure 13:
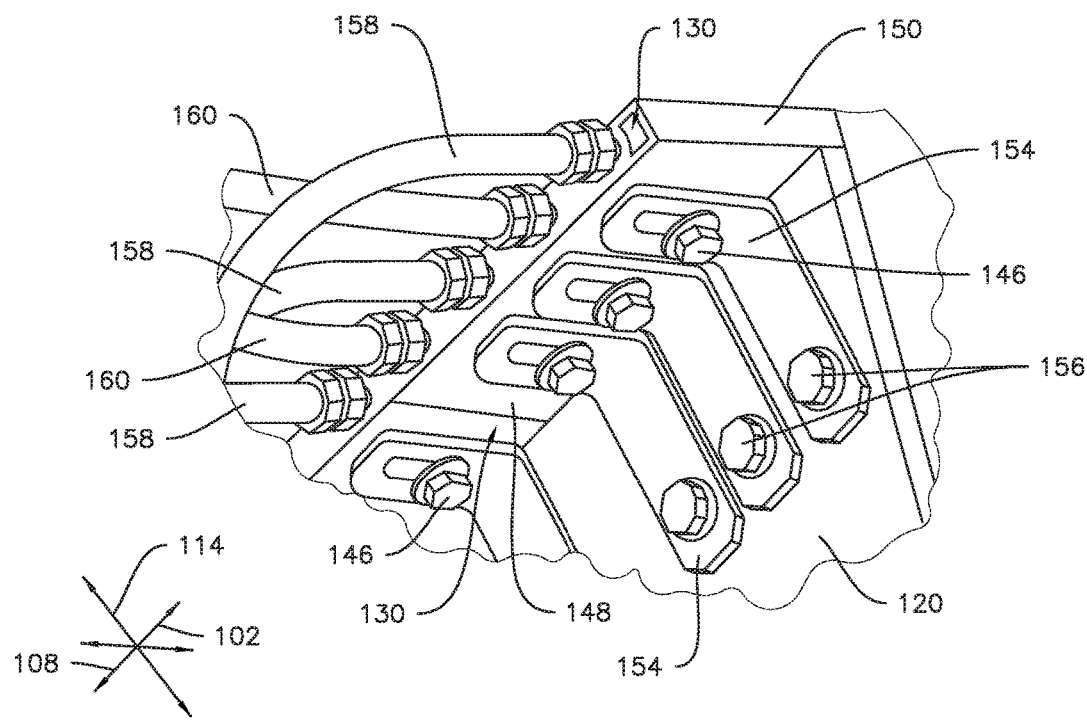
FIG. 13 is an perspective view of a portion of a vacuum forming mold assembly in accordance with aspects of the present disclosure, particularly illustrating a plurality of brackets removably coupling a pair of mold body segments to a support plate.

FIGS. 12 and 13 illustrate the mold assembly 100 when the mold body 122 is removably coupled to the support plates 120. Each mold body segment 130 is placed on the top surfaces 126 of the of the support plates 120. In one embodiment the mold body segments 130 may extend perpendicular to the support plates 120. For example, the mold body segments 130 may extend along the span-wise direction 102, while the support plates 120 may extend along the chord-wise direction 108. Nevertheless, in alternative embodiments, the mold body segment 130 may be arranged in any other suitable manner relative to the support plates 120. Each mold body segment 130 may then be coupled to one or more brackets 154 via the fasteners 146. The brackets 154 may, in turn, be coupled to the support plates 120 by suitable fasteners 156. The mold body segments 130 may be removably coupled to each other to form the mold body 122 before or after being removably coupled to the support plates 120. Furthermore, one or more vacuum hoses 158 may fluidly couple the vacuum source (not shown) to the vacuum manifolds 140 defined by mold body 122. Additionally, one or more fluid hoses 160 may fluidly couple the fluid source (not shown) to the fluid passages 138 defined by mold body 122.

After being coupled to the support plates 120, the mold body 122 defines the mold cavity 128. More specifically, as mentioned above, the top surfaces 126 of the support plates 120 define a shape corresponding to a cross-section of a portion of the mold cavity 128. For example, the shape of the top surfaces 126 of the support plates 120 may be the same as or similar to the cross-sectional shape of the mold cavity 128. As such, coupling the mold body segments 130 to the support plates 120 causes the mold body segments 130 to conform to the shape of the top surfaces 126 of the support plates 120. In several embodiments, as shown in FIGS. 10 and 11, the mold body segments 130 are planar or otherwise flat before being coupled to the support plates 120. As such, coupling the mold body segments 130 to the support plates 120 may cause the mold body segments 130 to deform or otherwise bend to conform to the shape of the top surfaces 126 of the support plates 120. After such deformation, the top surfaces 132 of the mold body segments 130, which define the same shape as or a similar shape to the top surfaces 126 of the support plates 120, define the mold cavity 128.

Figure 20:
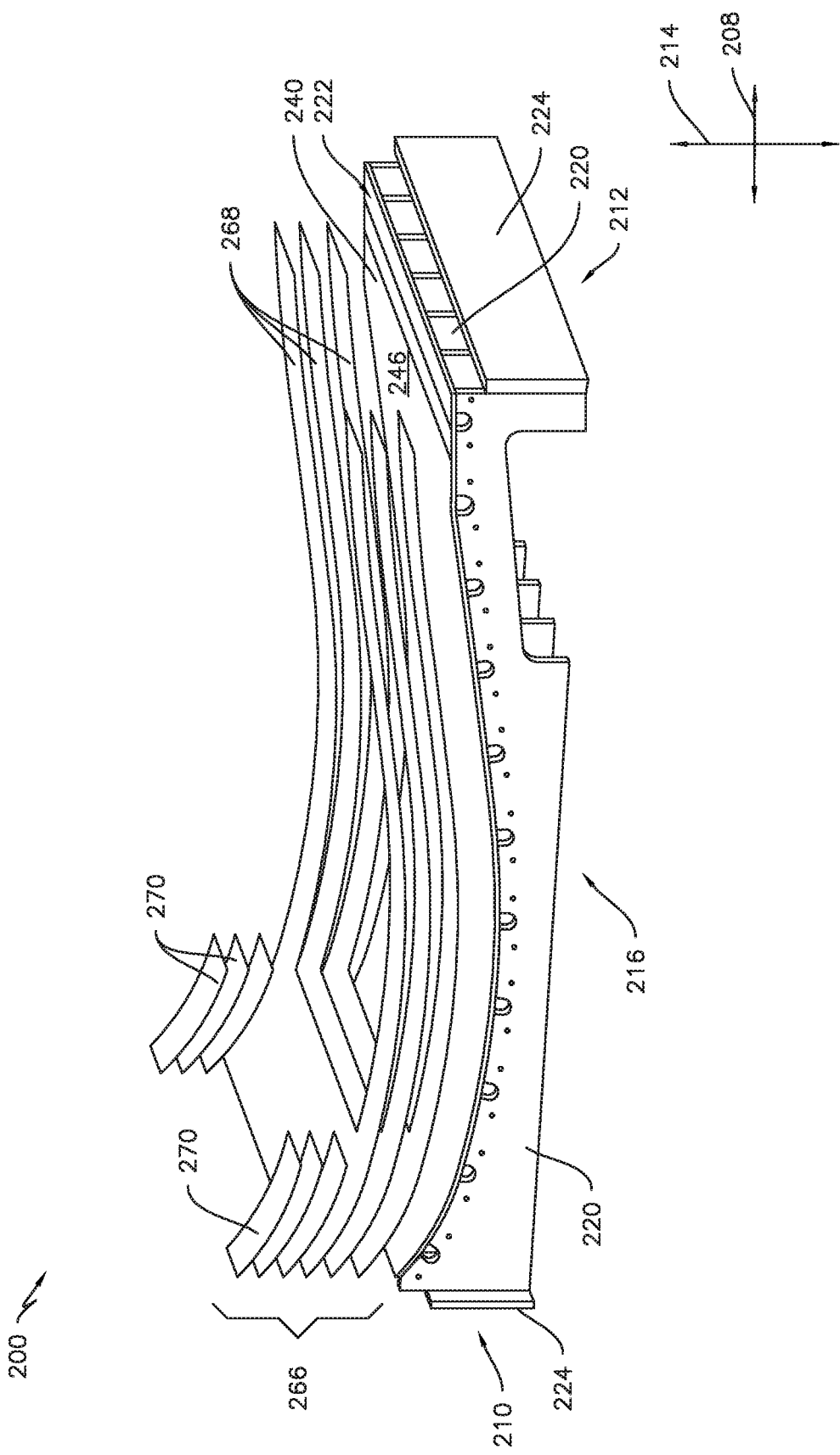
FIG. 20 is a perspective of the embodiment of a vacuum forming mold assembly shown in FIG. 14, illustrating an exploded view of a platform of the mold assembly.

The mold assembly 100 may include additional features as well. For example, the mold assembly 100 may include a gasket 264 (FIG. 21) positioned around its perimeter. In general, the gasket 264 is configured to provide a seal between the mold body 122 and a thermoplastic sheet placed on the mold to be formed into a component. In certain embodiments, the gasket 264 is used when forming a component from a reinforced thermoplastic sheet (e.g., fiberglass). For example, in one embodiment, the gasket 264 may be formed from silicone. Furthermore, the mold assembly 100 may include a platform 266 (FIG. 20). As will be discussed in greater detail below, the platform 266 is raised relative to the top surface of the mold body 122. In this respect, the platform 266 may be configured to form one or more joint features. For example, the joint features may be a portion of a lap joint on the formed component. The platform 266 may also be configured to form one or more connection features, such as indentions, cavities, recessed marks, and/or the like, in the blade segment 22, which may facilitate coupling of blade add-on features (e.g., flow anchors, vortex generators, etc.) to the blade segment 22. Furthermore, the platform 266 may be configured to form one or more alignment features (e.g., walls, ledges, bumps, projections, lines, ridges, pins, and/or the like) against which the thermoplastic sheet may be abutted.

Additionally, as shown in FIG. 8, the mold body 122 may define one or more grooves 162 in the top surface 132 thereof. More specifically, the grooves 162 are in fluid communication with the mold cavity 128. Furthermore, the grooves 162 are also in fluid communication with a vacuum source (not shown) via one or more vacuum ports 164 defined by the mold body 122. In this respect, the grooves 162 are configured to provide a vacuum to the mold cavity 128 that causes the thermoplastic sheet to adhere to the top surface 132 of the mold body 122. In the illustrated embodiment, the grooves 162 have a grid-like configuration. Although, in alternative embodiments, the grooves 162 may have any other suitable configuration and/or be present on any portion of the mold body 122. Furthermore, the vacuum port 164 is illustrated as being positioned proximate to an edge of the mold body 122. Nevertheless, the vacuum port 164 may be positioned in any other suitable location of the mold body 122.

FIGS. 14-19 illustrate another embodiment of a mold assembly 200 in accordance with aspects of the present disclosure. In general, the mold assembly 200 is configured for vacuum forming various thermoplastic components. For example, the mold assembly 200 may be configured to form one of the blade segments 28 of the rotor blade 22, such as one of the pressure side segments 56, suction side segments 58, the leading edge segments 60, and/or the trailing edge segments 62. Nevertheless, in alternative embodiments, the mold assembly 200 may be configured to form any other suitable thermoplastic component for use in any other suitable application, including applications outside of wind turbines. Furthermore, as will be described below, in one embodiment, the mold assembly 200 may be configured for placement within a bed of an additive manufacturing device (e.g., three-dimensional printer).

As illustrated in FIGS. 14-19, the mold assembly 200 defines various directions. More specifically, in several embodiments, the directions of the mold assembly 200 may be defined relative to the particular component of which the mold assembly 200 is configured to form (e.g., the blade segment 28). As such, in the illustrated embodiment, the mold assembly 200 defines a span-wise direction (e.g., as indicated by arrow 202 in FIGS. 14-19) extending between a root side 204 of the mold assembly 200 and a tip side 206 of the mold assembly 200. The mold assembly 200 also defines a chord-wise direction (e.g., as indicated by arrow 208 in FIGS. 14-19) extending between a leading edge side 210 of the mold assembly 200 and a trailing edge side 212 of the mold assembly 200. Furthermore, the mold assembly 200 defines a vertical direction (e.g., as indicated by arrow 214 in FIGS. 14-19) extending between a bottom side 216 of the mold assembly 200 and a top side 218 of the mold assembly 200. In alternative embodiments, however, the mold assembly 200 may define other directions in addition to or in lieu of the span-wise, chord-wise, and vertical directions 202, 208, 214 depending on the particular configuration of the thermoplastic component.

Figure 14:
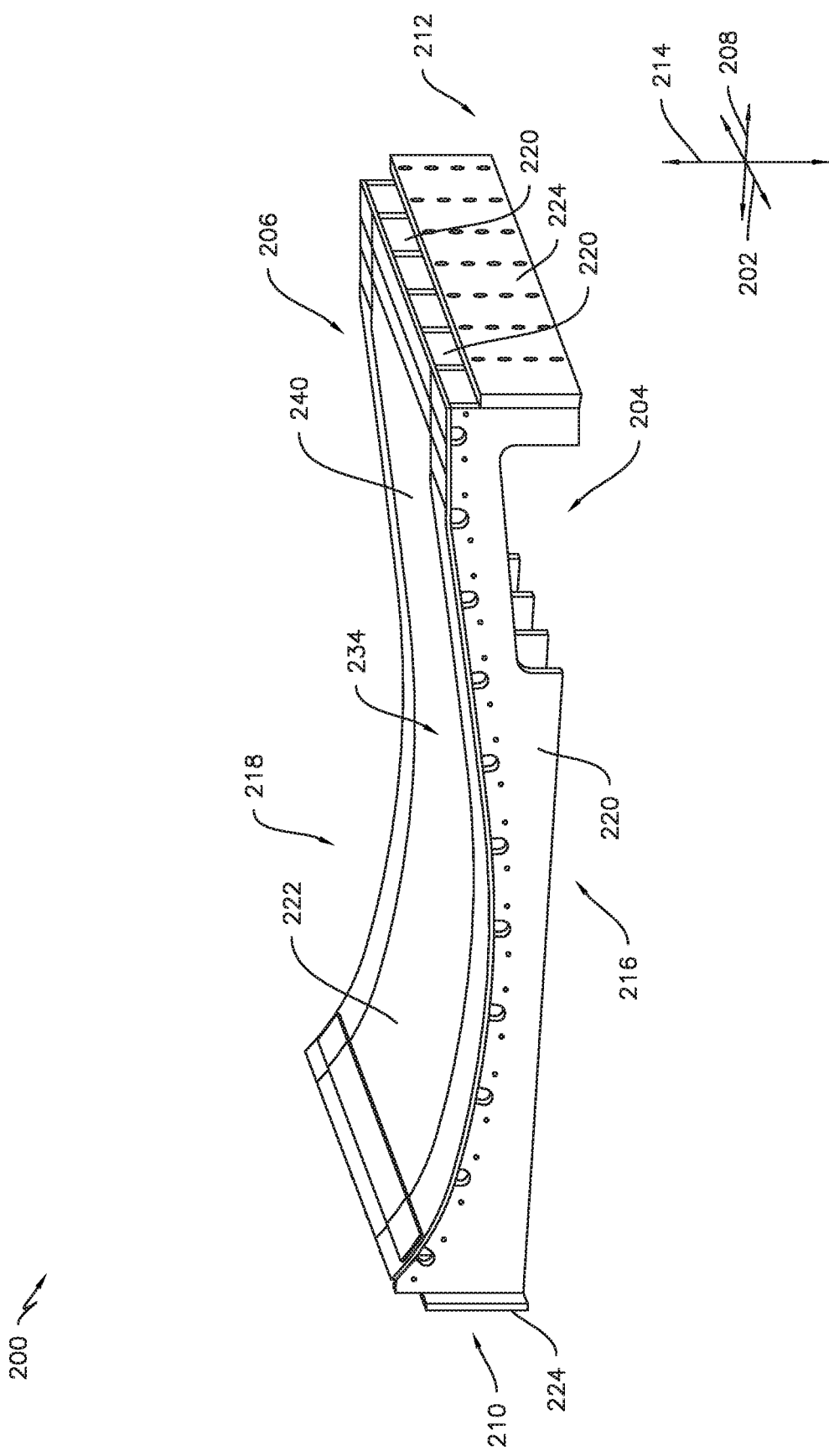
FIG. 14 is a perspective of another embodiment of a vacuum forming mold assembly in accordance with aspects of the present disclosure.
Figure 15:
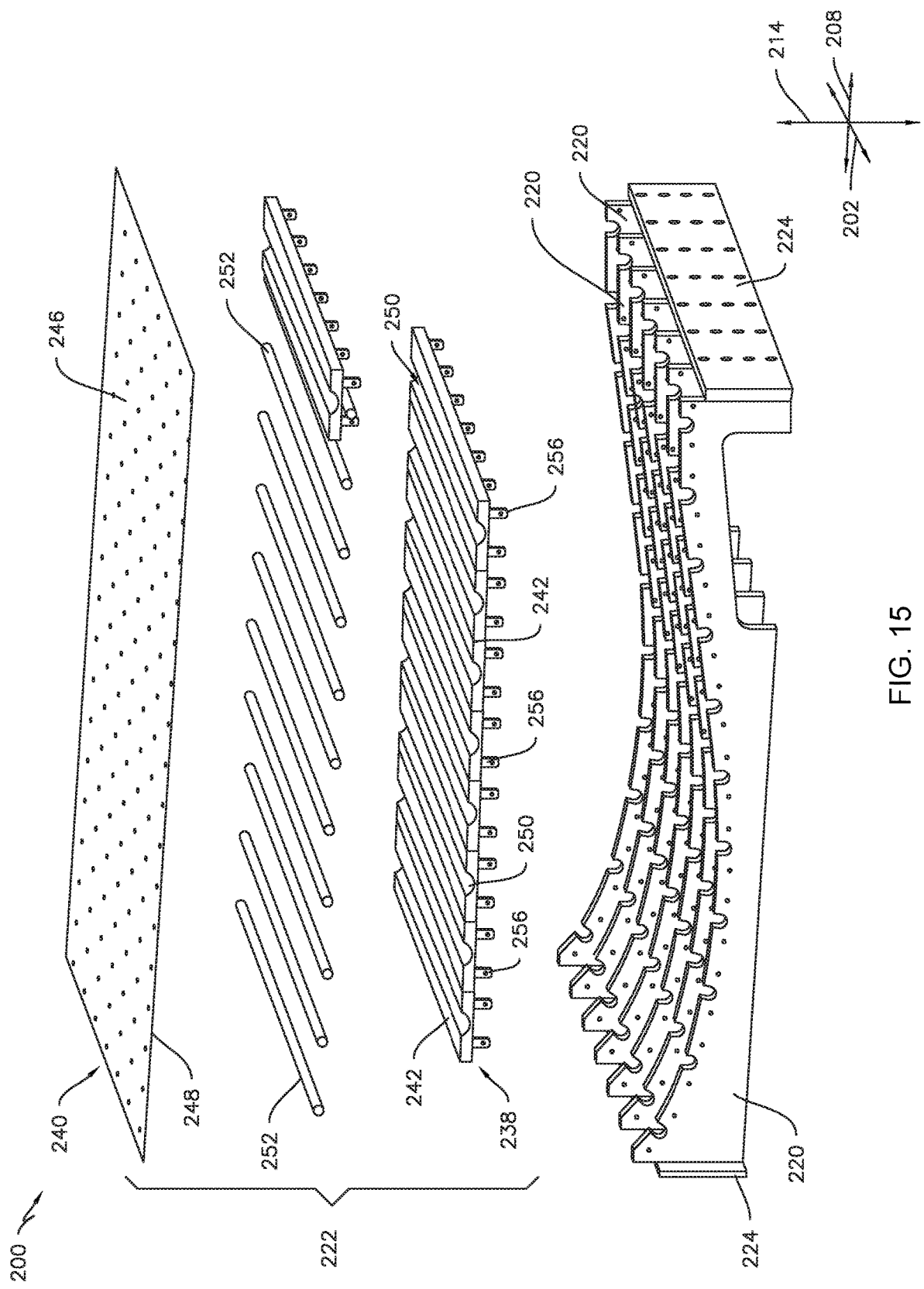
FIG. 15 is an exploded, perspective view of the vacuum forming mold assembly shown in FIG. 14 in accordance with aspects of the present disclosure.

As shown in FIGS. 14 and 15, the mold assembly 200 includes a plurality of spaced apart support plates 220. In general, the support plates 220 are configured to support a mold body 222 of the mold assembly 200 relative to a base frame (e.g., the base frame 124 shown in FIGS. 8 and 9) of the mold assembly 200. In this respect, the each support plate 220 may have a beam-like configuration. In one embodiment, the support plates 220 may be removably coupled together by end caps 224 to maintain the desired spacing between each of the support plats 220. In the illustrated embodiment, the support plates 220 may be spaced apart along the span-wise direction 202. However, in alternative embodiments, the support plates 220 may be spaced apart along the chord-wise direction 208 or any other suitable direction. Additionally, although the mold assembly 200 is shown as having a particular number of support plates 220, the mold assembly 200 may include any suitable number of support plates 220.

Figure 16:
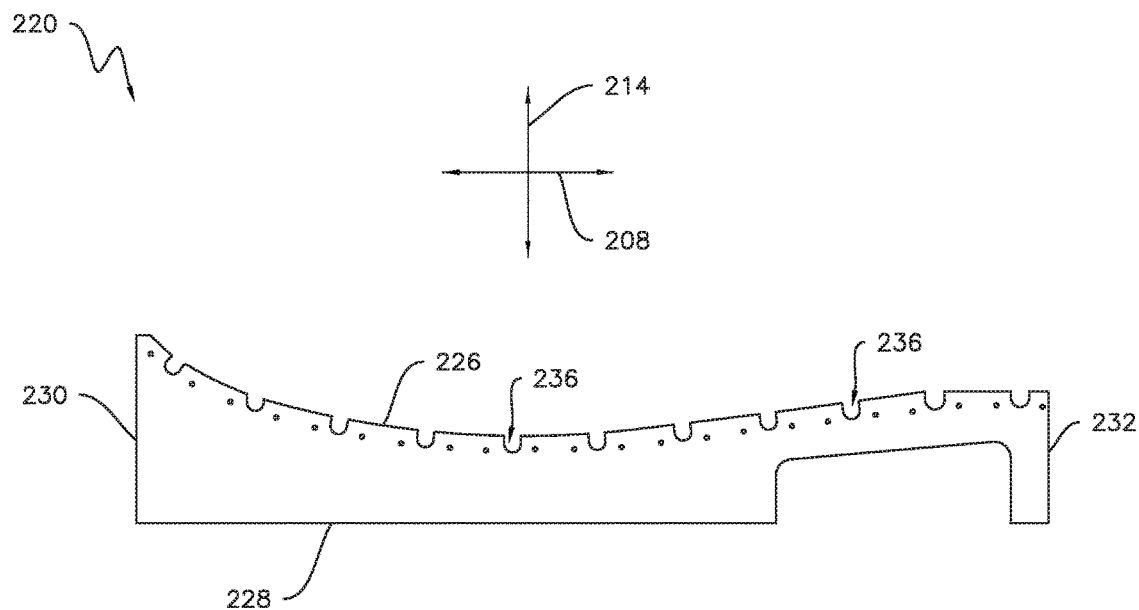
FIG. 16 is a side view of one embodiment of a support plate of a vacuum forming mold assembly in accordance with aspects of the present disclosure.

FIG. 16 illustrates one of the support plates 220 in greater detail. As shown, the support plate 220 includes a top surface 226 and a bottom surface 228 vertical spaced apart from the top surface 226. In this respect, the top surface 226 of the support plate 220 may be positioned at or proximate the top side 218 of the mold assembly 200, while the bottom surface 228 of the support plate 220 may be positioned at or proximate to the bottom side 216 of the mold assembly 200. Similarly, the support plate 220 includes a leading edge side surface 230 and a trailing edge surface 232 vertically spaced apart from the leading edge side surface 230. In this respect, the leading edge side surface 230 of the support plate 220 may be positioned at or proximate the leading edge side 210 of the mold assembly 200, while the trailing edge side surface 232 of the support plate 220 may be positioned at or proximate to the trailing edge side 212 of the mold assembly 200. As will be described in greater detail below, the top surface 226 defining a shape corresponding to a cross-section of at least a portion of a mold cavity 234 (FIG. 14) of the mold assembly 200. Furthermore, the support plate 220 may define a one or more grooves 236 extending from the top surface 226 vertically downward toward the bottom surface 228. Nevertheless, in alternative embodiments, the support plate 220 may have any other suitable configuration.

Figure 17:
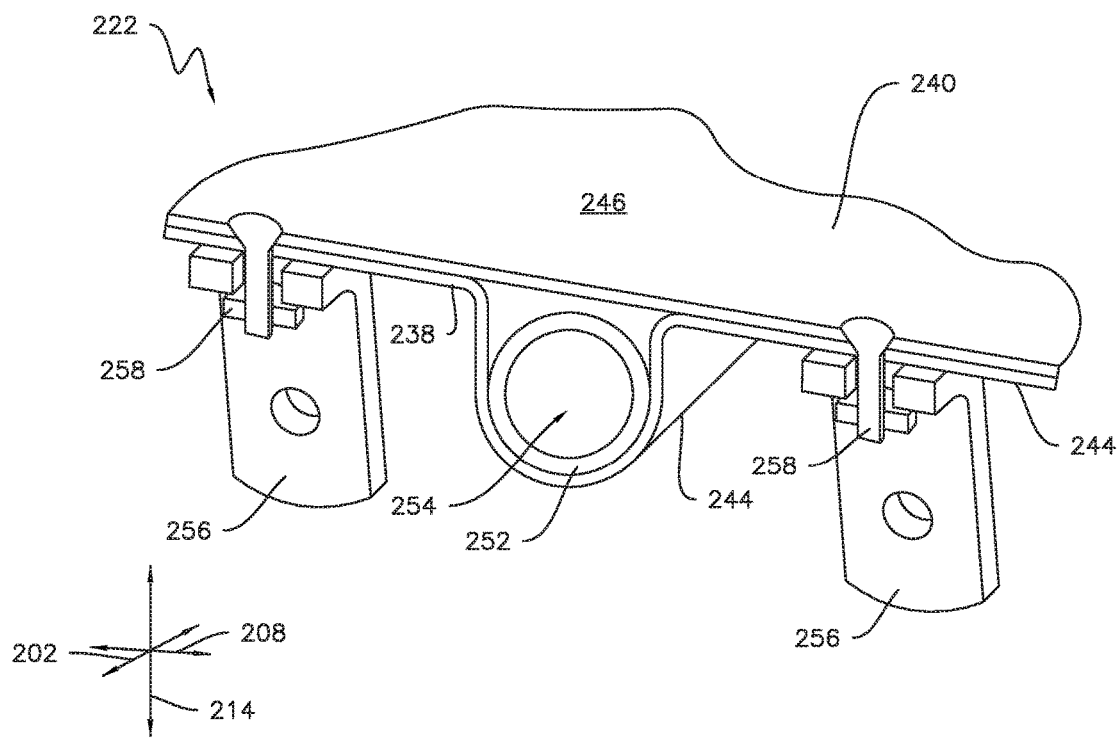
FIG. 17 is a perspective view of a portion of one embodiment of a mold body of a vacuum forming mold assembly in accordance with aspects of the present disclosure.

As indicated above, the mold assembly 200 includes the mold body 222. As illustrated in FIGS. 15 and 17, the mold body 222 may include one or more base plates 238 and one or more top plates 240. More specifically, each base plate 238 includes a top surface 242 and a bottom surface 244 vertically spaced apart from the top surface 242. Similarly, each top plate 240 includes a top surface 246 and a bottom surface 248 vertically spaced apart from the top surface 246. In several embodiments, when the mold body 222 is assembled, the top surfaces 242 of the one or more base plates 238 are contact with the bottom surfaces 248 of the one or more top plates 240. In one embodiment, the base plates 238 may be corrugated or otherwise formed such that mold body 222 defines one or more passages 250 positioned vertically between the base and top plates 238, 240. For example, the passages 250 may extend along the span-wise direction 202 and be spaced apart from each other along the chord-wise direction 208. Nevertheless, in alternative embodiments, the passages 250 may extend along any other suitable direction and/or be spaced apart from each other along any other suitable direction. Furthermore, some embodiments of the mold body 222 may not include the passages 250. Additionally, in further embodiments, the mold body 222 may include only one layer of plates or more than two layers of plates.

The mold body 222 may include one or more tubes 252 in embodiments where the mold body 22 defines the passages 250. As shown, each tube 252 is positioned within one of the passages 250. In this respect, the tubes 252 are positioned vertically between the base and top plates 238, 240. Furthermore, each tube 252 defines a fluid passage 254 extending therethrough. In general, a heating fluid may flow through the fluid passages 254 in the tubes 252 to heat the mold body 222 for vacuum forming a thermoplastic sheet. Although, a coolant may flow through the fluid passageway 254 to cool the mold body 222 in certain embodiments. In certain embodiments, an external heater (not shown) coupled to the bottom surfaces 244 of the base plate 238 of the mold body 222 may heat the mold body 222 in addition to or in lieu of the fluid flowing through the fluid passages 254. For example, such heating elements may permit selective heating of particular portions of the mold body 122.

Figure 18:
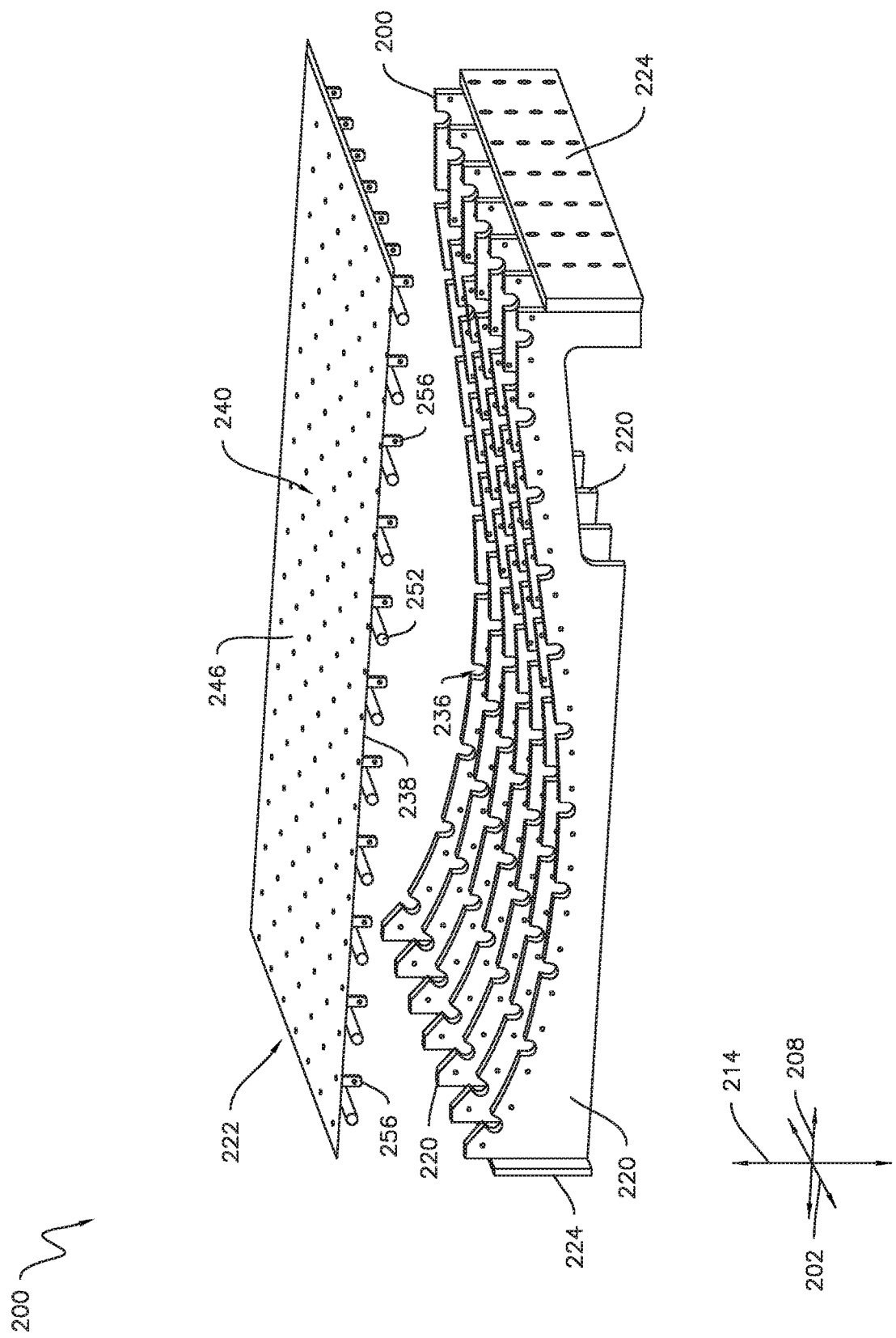
FIG. 18 is a partial exploded, perspective view of the vacuum forming mold shown in FIGS. 14 and 15, illustrating a mold body before being removably coupled to a plurality of support plates.
Figure 19:
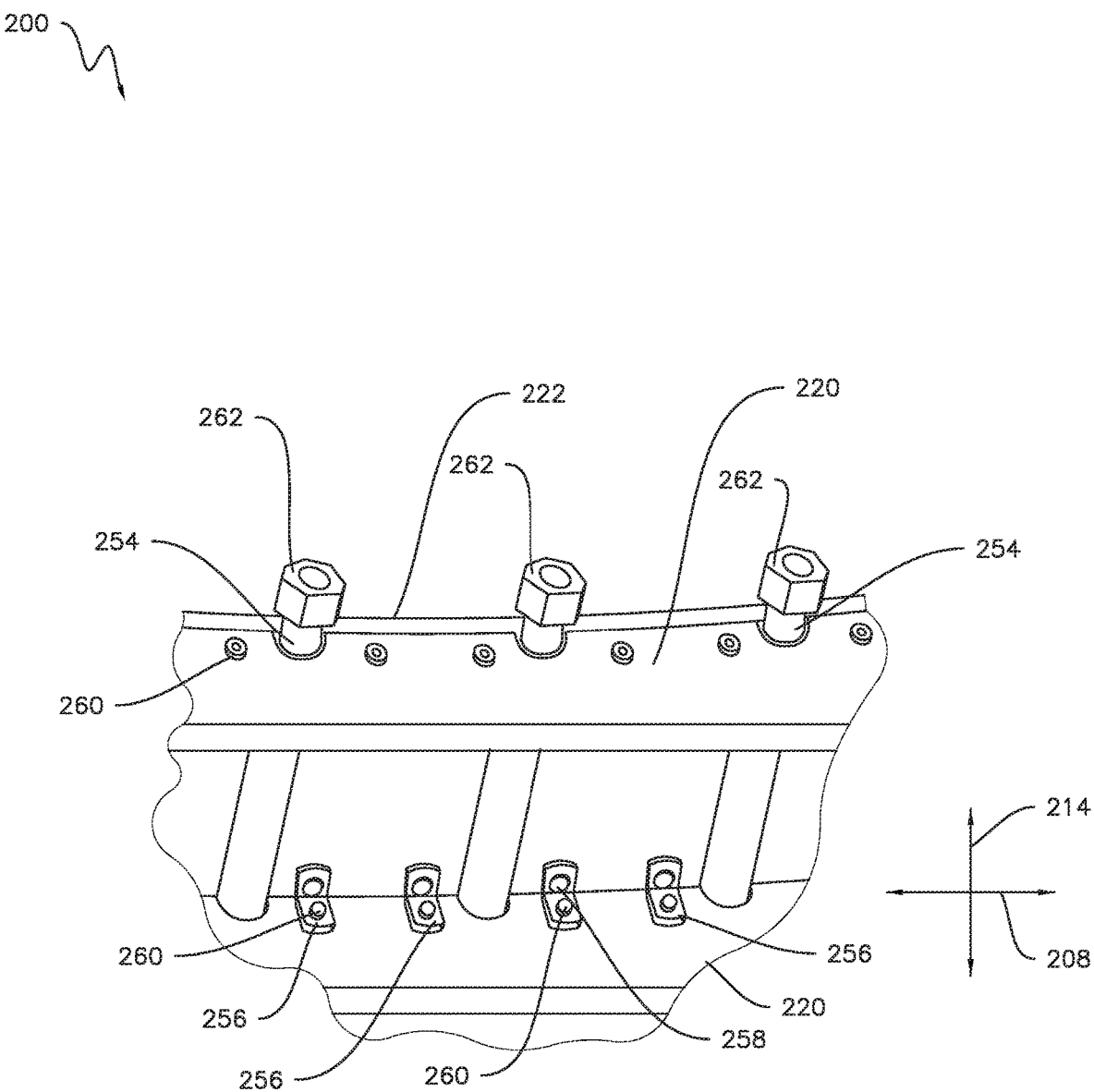
FIG. 19 is a perspective view of a portion of a vacuum forming mold assembly in accordance with aspects of the present disclosure, illustrating a mold body being removably coupled to a plurality of support plates.

Referring now to FIGS. 14, 18, and 19, the mold body 222 is removably coupled to the support plates 220. More specifically, the mold body 222 may be placed on the top surfaces 226 of the of the support plates 220. The mold body 222 may then be coupled to one or more brackets 256 via fasteners 258. The brackets 256 may, in turn, be coupled to the support plates 220 by suitable fasteners 260. Furthermore, one or more fluid connectors 262 may fluidly couple the fluid passageways 254 defined by the tubes 254 to a fluid source (not shown).

After coupling to the support plates 220, the mold body 222 defines the mold cavity 234. More specifically, as mentioned above, the top surfaces 226 of the support plates 220 define a shape corresponding to a cross-section of a portion of the mold cavity 234. For example, the shape of top surfaces 226 of the support plates 220 may be the same as or similar to the cross-sectional shape of the mold cavity 234. As such, coupling the mold body 222 to the support plates 220 causes the mold body 222 to conform to the shape of the top surfaces 226 of the support plates 220. In several embodiments, as shown in FIG. 18, the mold body 222 is planar or otherwise flat before being coupled to the support plates 220. As such, coupling the mold body 222 to the support plates 220 may cause the mold body 222 to deform or otherwise bend to conform to the shape of the top surfaces 226 of the support plates 220. After such deformation, the top surface 246 of the top plate 240 of the mold body 222, which defines the same shape as or a similar shape to the top surfaces 226 of the support plates 220, define the mold cavity 234.

Figure 21:
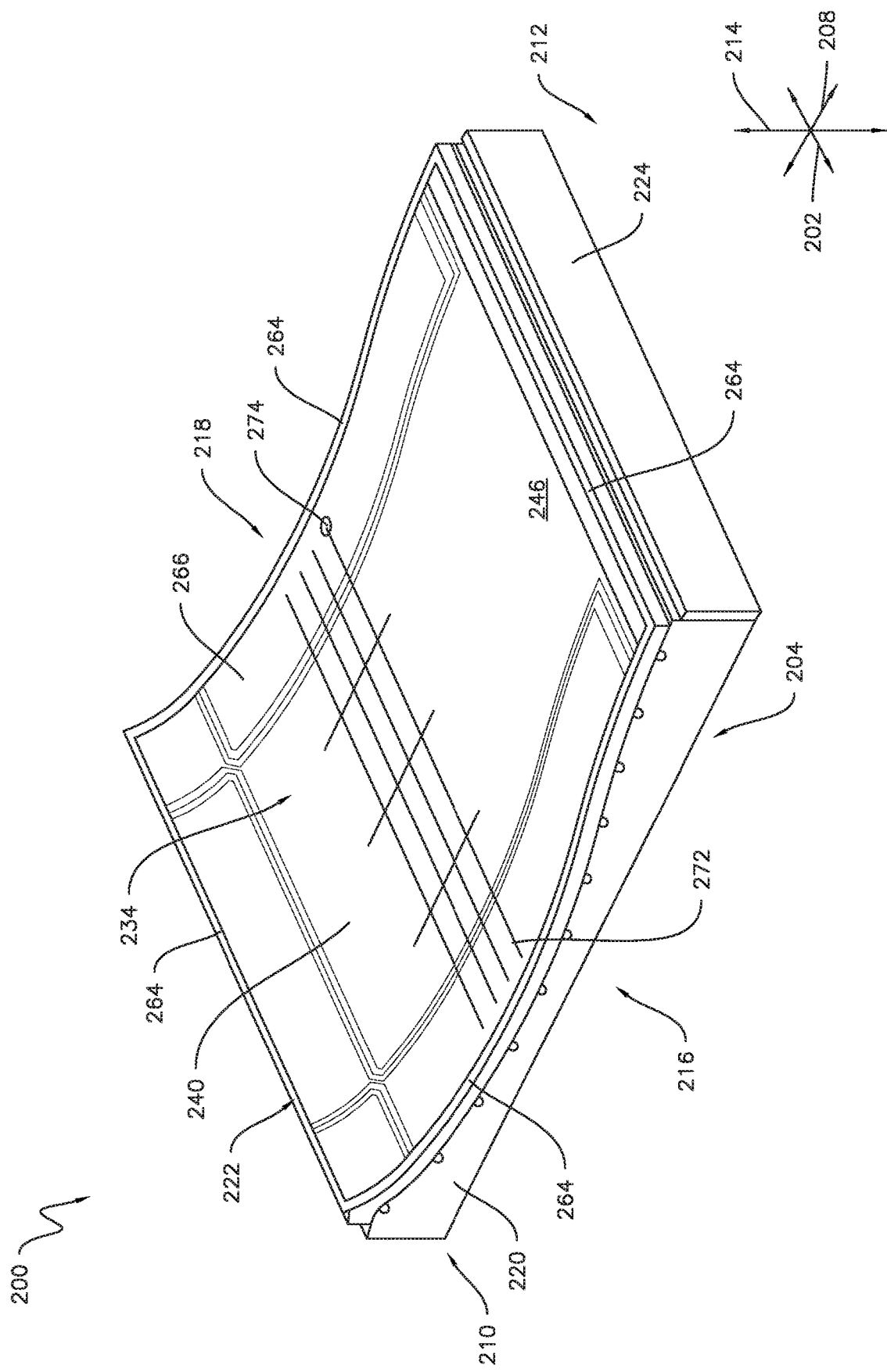
FIG. 21 is a perspective of the embodiment of a vacuum forming mold assembly shown in FIGS. 14 and 20, illustrating a gasket of the mold assembly.

Referring now to FIGS. 20 and 21, the mold assembly 200 may include the platform 266 coupled to or otherwise positioned on the top surface 246 of the top plate 240. In general, the platform 266 is raised relative to the top surface 246 such that a portion of a lap joint is formed in the component. As shown, the platform 266 may be formed from a plurality of U-shaped sheets 268 and a plurality of rectangular sheets 270. In several embodiments, the sheets 268, 270 have a stair step-like configuration to provide a gradual transition between the top 246 of the mold body 22 and the top of the platform 266. The sheets 268, 270 may be adhesively coupled together, welded, or otherwise coupled together in any suitable manner. In one embodiment, the sheets 268, 270 are formed from aluminum. Nevertheless, the platform 266 may formed from any suitable number, shape, and/or material of sheets. Furthermore, the platform 266 may be integrally formed (e.g., 3D printed) in some embodiments.

Referring particularly to FIG. 20, the mold assembly 200 may include a gasket 264 positioned around its perimeter. In general, the gasket 264 is configured to provide a seal between the mold body 222 and a thermoplastic sheet placed on the mold body 222 to be formed into a component. In certain embodiments, the gasket 264 is used when forming a component from a reinforced thermoplastic sheet (e.g., fiberglass). For example, in one embodiment, the gasket 264 may be formed from silicone. Although, the gasket 264 may be formed from any other suitable material.

Additionally, the top plate 240 of the mold body 222 may define one or more grooves 272 in the top surface 246 thereof. More specifically, the grooves 272 are in fluid communication with the mold cavity 234. Furthermore, the grooves 272 are also in fluid communication with a vacuum source (not shown) via one or more vacuum ports 274 defined by the mold body 222. In this respect, the grooves 272 are configured to provide a vacuum to the mold cavity 234 that causes the thermoplastic sheet to adhere to the top surface 246 of the mold body 222. In the illustrated embodiment, the grooves 272 have a grid-like configuration. Although, in alternative embodiments, the grooves 272 may have any other suitable configuration and/or be present on any portion of the mold body 222. Furthermore, the vacuum port 274 is illustrated as being positioned proximate to an edge of the mold body 222. Nevertheless, the vacuum port 274 may be positioned in any other suitable location of the mold body 222.

In certain embodiments, the mold assemblies 100 and/or 200 may be incorporated into or otherwise combined with other types of mold assemblies or mold assembly portions. For example, the mold assembly 100 and/or 200 may be used to form the portions of the rotor blade 22 proximate to its mid-span portions of the rotor blade 22, while another mold assembly having a different configuration (e.g., one that requires machining its mold cavity) the portions of the rotor blade 22 positioned proximate to its tip. Additionally, the mold assembly 100 may be used to form a first part of a component and the mold assembly 200 may be used form a second part of the component. Nevertheless, the mold assemblies 100, 200 may be used alone to form a component.

Moreover, various aspects of one of the mold assemblies 100, 200 may be combined or otherwise be incorporated into the other of the mold assemblies 100, 200. For example, one or more of the top plates 240 may be placed on the top surfaces 132 of the mold body 122 of the mold assembly 100. However, in other embodiments, no top plate 240 or other sheet metal-like component is placed on the top surfaces 132 of the mold body 122 of the mold assembly 100.

Figure 22:
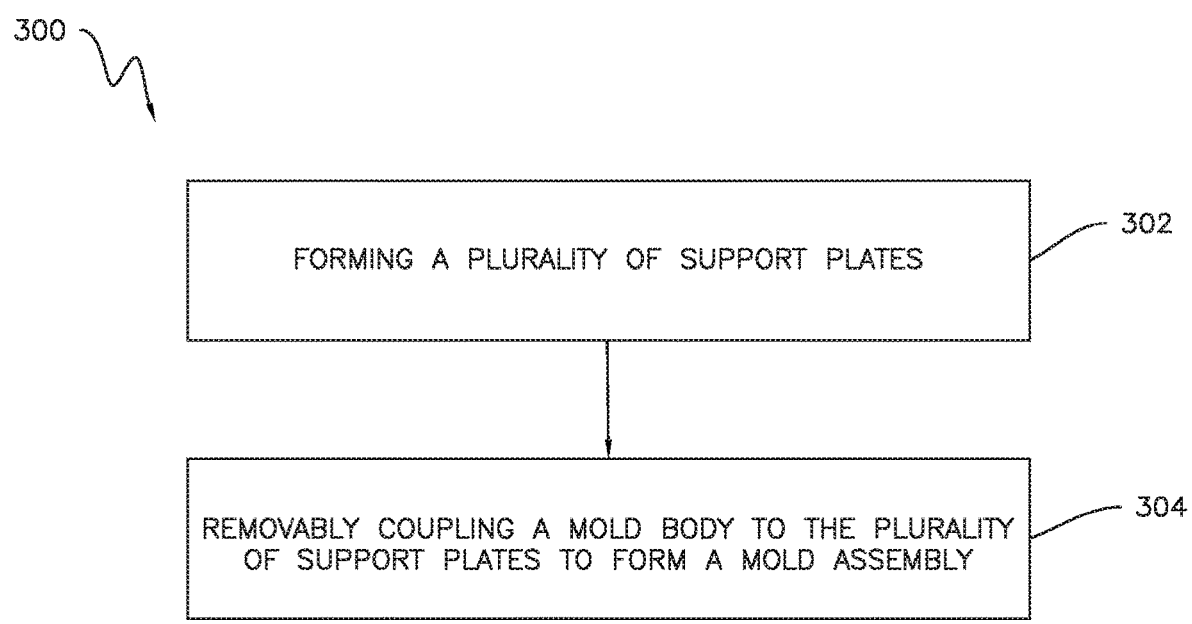
FIG. 22 is a flow chart illustrating one embodiment of a method for creating a vacuum forming mold assembly in accordance with aspects of the present disclosure.

FIG. 22 illustrates one embodiment of a method 300 for creating a vacuum forming mold assembly in accordance with aspects of the present subject matter. Although FIG. 22 depicts steps performed in a particular order for purposes of illustration and discussion, the methods discussed herein are not limited to any particular order or arrangement. As such, the various steps of the methods disclosed herein can be omitted, rearranged, combined, and/or adapted in various ways without deviating from the scope of the present disclosure.

As shown in FIG. 22, at (302), the method 300 includes forming a plurality of support plates. For example, the plurality of support plates 120, 220 may be formed, such as via water jet cutting. As discussed in greater detail above, after formation, the top surfaces 126, 226 of the support plates 120, 220 define a shape corresponding to a cross-section of at least a portion of the mold cavity 128, 234.

At (304), the method 300 includes removably coupling a mold body to the plurality of support plates to form a mold assembly. For example, in one embodiment, the plurality of mold body segments 130 may be coupled to the support plates 120 via the brackets 154 and fasteners 146, 156. Once coupled to the support plates 120, the mold body segments 130 conform to the shape of the top surfaces 126 of each support plate 120 such that the mold body 122 defines the mold cavity 128. In another embodiment, the mold body 222, which may include the base plate 238, the top plate 240, and/or the tubes 254, may be coupled to the plurality of support plates 222 using the brackets 256 and fasteners 258, 260. Once coupled to the support plates 220, the mold body 222 conforms to the shape of the top surfaces 226 of each support plate 220 such that the mold body 222 defines the mold cavity 234.

The mold assemblies 100, 200 and the associated method 300 for creating the mold assemblies 100, 200 provide advantages over conventional vacuum forming molds and methods of forming such molds. For example, as described above, support plates 120, 22 include top surfaces 126, 226 that define shapes corresponding to the cross-sectional shape of the mold cavities 128, 234. As such, the mold bodies 122, 222 conform (e.g., via deformation) to these top surfaces 126, 226 such that the mold bodies 122, 222 define the mold cavities 128, 234. In this respect, and unlike conventional vacuum forming molds and methods of forming such molds, the mold assemblies 100, 200 and the associated method 300 do not require machining to form the mold cavities 128, 234. Accordingly, the mold assemblies 100, 200 are less expensive to produce than conventional mold assemblies, thereby reducing the overall cost of the wind turbine.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for creating a vacuum forming mold assembly, the method comprising:
forming a plurality of support plates, each support plate including a top surface defining a curved shape corresponding to a cross-section of at least a portion of a mold cavity; and
removably coupling a mold body to the plurality of support plates to form the mold assembly such that the mold body conforms to the curved shape of the top surface of each support plate after being removably coupled to the plurality of support plates, the mold body defining at least a portion of a mold cavity of the mold assembly, the mold body further defining one or more vacuum manifolds, a plurality of vacuum passages fluidly coupled to the one or more vacuum manifolds, and one or more fluid passages.

2. The method of claim 1 further comprising:
deforming the mold body such that the mold body conforms to the curved shape of the top surface of one or more support plates prior to removably coupling the mold body to the plurality of support plates.

3. The method of claim 1, further comprising:
positioning one or more base plates of the mold body on the top surface of each support plate;
deforming the one or more base plates such that the mold body conforms to the curved shape of the top surface of each support plate;
positioning one or more top plates of the mold body on the one or more base plates; and
deforming the one or more top plates such that the one or more top plates conforms to the curved shape of the one or more base plates, the one or more top plates defining the mold cavity.

4. The method of claim 3, further comprising:
forming one or more grooves in a top surface of the mold body, the one or more grooves being in fluid communication with the mold cavity, the groove further being configured to be fluidly coupled to a vacuum source via one or more vacuum ports.

5. The method of claim 3, further comprising:
positioning one or more tubes between one or more of the base plates of the mold body and one or more of the top plates of the mold body, one or more of the tubes defining the one or more of the fluid passages.

6. The method of claim 1, further comprising:
positioning the plurality of support plates such that each support plate is spaced apart from each other support plate along a span-wise direction.

7. A vacuum forming mold assembly, comprising:
a plurality of support plates, each support plate including a top surface defining a curved shape corresponding to a cross-section of at least a portion of a mold cavity; and
a mold body removably coupled to the plurality of support plates, the mold body conforming to the curved shape of the top surface of each support plate after being removably coupled to the plurality of support plates, the mold body defining at least a portion of a mold cavity of the mold assembly, the mold body further defining one or more vacuum manifolds, a plurality of vacuum passages fluidly coupled to the one or more vacuum manifolds, and one or more fluid passages.

8. The vacuum forming mold assembly of claim 7, wherein the mold body is planar before being removably coupled to the plurality of support plates, the mold body being configured to deform when removably coupled to the plurality of support plates that the mold body conforms to the curved shape of the top surface of each support plate.

9. The vacuum forming mold assembly of claim 7, wherein the mold plate comprises one or more base plates positioned on the top surface of each support plate and one or more top plates positioned on the one or more base plates, the one or more base plates conforming to the curved shape of the shape of each support plate, the one or more top plates conforming to the curved shape of the one or more base plates, the one or more top plates defining the mold cavity.

10. The vacuum forming mold assembly of claim 9, wherein a top surface of the one or more top plates defines one or more grooves in fluid communication with the mold cavity, the groove further being configured to be fluidly coupled to a vacuum source via one or more vacuum ports.

11. The vacuum forming mold assembly of claim 9, wherein the mold body further comprises one or more tubes positioned between the one or more base plates and the one or more top plates, the one or more tubes defining one or more of the one or more fluid passages.

12. The vacuum forming mold assembly of claim 7, wherein each support plate is spaced apart from each other support plate along a span-wise direction.

13. The vacuum forming mold assembly of claim 7, wherein the mold body comprises a plurality of mold body segments removably coupled together.

14. The method of claim 1, wherein each support plate extends from a leading edge side surface to a trailing edge side surface such that the curved shape defined by the top surface of each support plate extends between the corresponding leading edge side surface and the corresponding trailing edge side surface.

15. The method of claim 14, wherein each support plate extends continuously from leading edge side surface to the trailing edge side surface.

16. The method of claim 1, wherein the one or more vacuum manifolds comprises a plurality of vacuum manifolds and the one or more fluid passages comprises a plurality of fluid passages, the plurality of vacuum manifolds and the plurality of fluid passages being uniformly spaced from a curved mold surface of the mold cavity in a vertical direction.

17. The method of claim 1, wherein the mold body comprises a plurality of mold body segments, each mold body segment including a first connection feature and a second connection feature, the method further comprising:
stacking the plurality of mold body segments together in a span-wise direction such that the first connection feature of one of the mold body segments mates with the second connection feature of another of the mold body segments; and
removably coupling the mated first and second connection features together to at least partially form the mold body.

18. A method for creating a vacuum forming mold assembly, the method comprising:
forming a plurality of support plates, each support plate including a top surface defining a shape corresponding to a cross-section of at least a portion of a mold cavity;

stacking a plurality mold body segments together in a span-wise direction such that a first connection feature of one of the mold body segments mates with a second connection feature of another of the mold body segments;

removably coupling the mated first and second connection features together to at least partially form the mold body; and removably coupling the mold body to the plurality of support plates to form a mold assembly such that the mold body conforms to the shape of the top surface of each support plate after being removably coupled to the plurality of support plates, the mold body defining at least a portion of a mold cavity of the mold assembly, the mold body further defining one or more vacuum manifolds, a plurality of vacuum passages fluidly coupled to the one or more vacuum manifolds, and one or more fluid passages.

19. The method of claim 18, wherein removably coupling the mold body segments together comprises fastening the mated first and second connection features with fasteners and removably coupling the mold body segments to the plurality of support plates comprises engaging one or more fasteners with slots defined in the mold body segments.

20. The method of claim 19, wherein engaging the one or more fasteners comprises engaging the one or more fasteners with slots defined between the one or more fluid passages or plurality of vacuum passages in the mold body segments.

* * * * *